(12) United States Patent
Anan et al.

(10) Patent No.: US 10,180,364 B2
(45) Date of Patent: Jan. 15, 2019

(54) LOAD SENSOR WITH VERTICAL TRANSISTORS

(71) Applicant: DENSO CORPORATION, Kariya, Aichi-pref. (JP)

(72) Inventors: Hiroo Anan, Kariya (JP); Takashi Inoue, Kariya (JP)

(73) Assignee: DENSO CORPORATION, Kariya (JP)

( * ) Notice: Subject to any disclaimer, the term of this patent is extended or adjusted under 35 U.S.C. 154(b) by 107 days.

(21) Appl. No.: 15/314,969

(22) PCT Filed: Aug. 21, 2015

(86) PCT No.: PCT/JP2015/004218
§ 371 (c)(1),
(2) Date: Nov. 30, 2016

(87) PCT Pub. No.: WO2016/042707
PCT Pub. Date: Mar. 24, 2016

(65) Prior Publication Data
US 2017/0199090 A1 Jul. 13, 2017

(30) Foreign Application Priority Data
Sep. 15, 2014 (JP) ................................. 2014-187158

(51) Int. Cl.
*G01L 1/20* (2006.01)
*G01L 1/18* (2006.01)
*G01L 5/16* (2006.01)

(52) U.S. Cl.
CPC ................. *G01L 1/18* (2013.01); *G01L 1/20* (2013.01); *G01L 5/16* (2013.01)

(58) Field of Classification Search
CPC ..... G01L 1/20; G01L 5/16; G01L 1/16; G01L 15/00; G01L 1/18; G01L 9/00;
(Continued)

(56) References Cited

U.S. PATENT DOCUMENTS

| 9,658,121 B2 * | 5/2017 | Inoue ........................ G01L 1/18 |
| 2001/0030324 A1 * | 10/2001 | Morikawa ......... H01L 27/14609 257/59 |
| 2011/0062435 A1 * | 3/2011 | Yamazaki ........... H01L 29/7869 257/43 |

FOREIGN PATENT DOCUMENTS

| JP | 2008-116371 A | 5/2008 |
| JP | 2013-179142 A | 9/2013 |

(Continued)

*Primary Examiner* — Harshad R Patel
*Assistant Examiner* — Brandi N Hopkins
(74) *Attorney, Agent, or Firm* — Posz Law Group, PLC

(57) ABSTRACT

A load sensor includes: a substrate; a rib on the substrate; and two vertical transistors. Each vertical transistor includes: a gate electrode, a gate insulation film, and a semiconductor thin film on the side surface of the rib; a bottom electrode layer on a bottom of the substrate, on which the rib is not arranged, with contacting the semiconductor thin film; and a top electrode layer on a top of the rib with contacting the semiconductor thin film. Each vertical transistor flows current between the bottom electrode layer and the top electrode layer when a channel region is provided in the semiconductor thin film. Each straight line along normal line directions of the channel regions in the vertical transistors is arranged on a different side surface of the rib from each other, and has a predetermined angle between the straight lines.

9 Claims, 19 Drawing Sheets

(58) Field of Classification Search
CPC ......... G01L 9/04; H01L 29/786; H01L 21/28; H01L 21/3065; H01L 21/336; H01L 29/41; H01L 29/423; H01L 29/49; H01L 29/84
See application file for complete search history.

(56) References Cited

FOREIGN PATENT DOCUMENTS

| | | | | |
|---|---|---|---|---|
| JP | 2015-040778 A | 3/2015 | | |
| JP | 2015-064328 A | 4/2015 | | |
| JP | 2015-146693 A | 8/2015 | | |
| JP | 2013165175 | * | 8/2015 | ....... H01L 21/32139 |
| JP | 2016-133450 A | 7/2016 | | |
| WO | 2009/133891 A1 | 11/2009 | | |

* cited by examiner

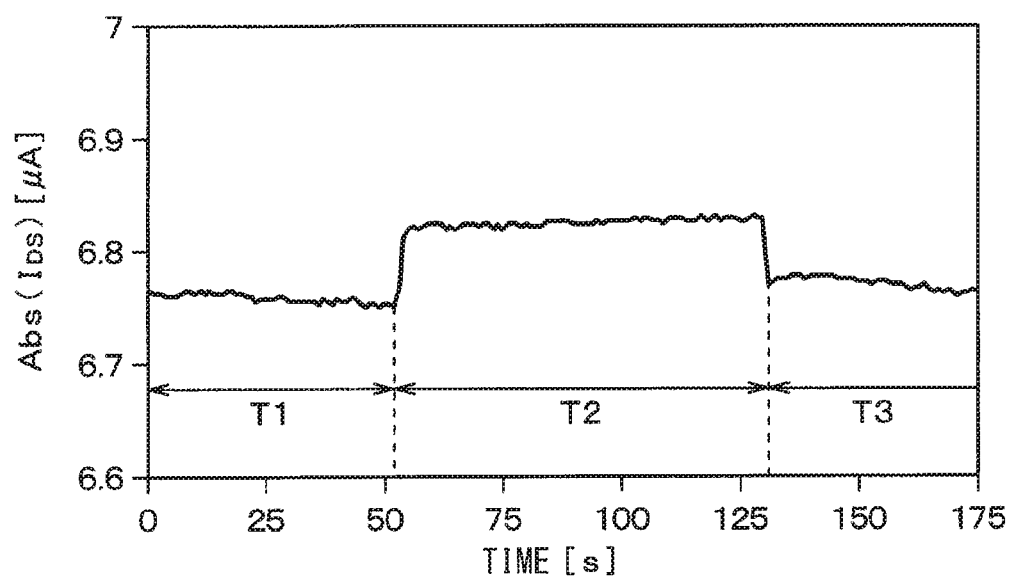

| | | CHANGE POLARITIES OF OUTPUT CURRENTS | |
|---|---|---|---|
| | | DETECTION UNIT | |
| | | FIRST VERTICAL TRANSISTOR | SECOND VERTICAL TRANSISTOR |
| HORIZONTAL LOADING DIRECTION | UP | + | 0 |
| | BOTTOM | − | 0 |
| | LEFT | 0 | − |
| | RIGHT | 0 | + |
| VERTICAL LOADING DIRECTION | PRESSING | + | + |

| | | CHANGE POLARITIES OF OUTPUT CURRENTS | | | |
| --- | --- | --- | --- | --- | --- |
| | | DETECTION UNIT | | | |
| | | FIRST VERTICAL TRANSISTOR | SECOND VERTICAL TRANSISTOR | THIRD VERTICAL TRANSISTOR | FOURTH VERTICAL TRANSISTOR |
| HORIZONTAL LOADING DIRECTION | UP | + | − | 0 | 0 |
| | BOTTOM | − | + | 0 | 0 |
| | LEFT | 0 | 0 | + | − |
| | RIGHT | 0 | 0 | − | + |
| VERTICAL LOADING DIRECTION | PRESSING | + | + | + | + |

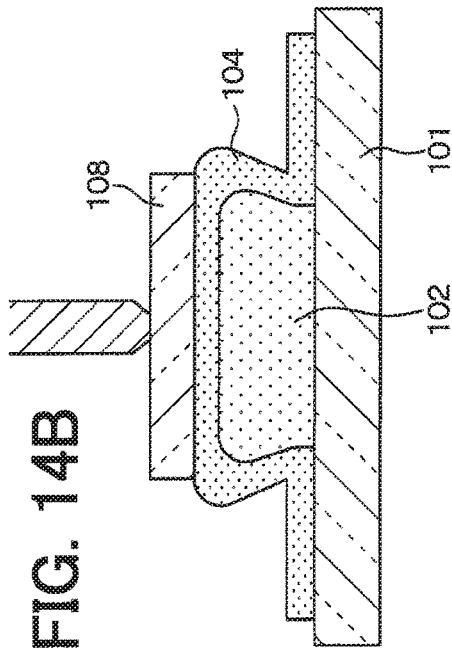
FIG. 14A
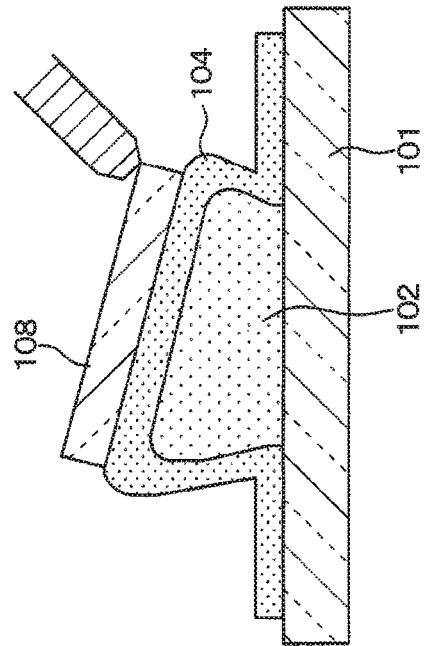
FIG. 14B
FIG. 14C
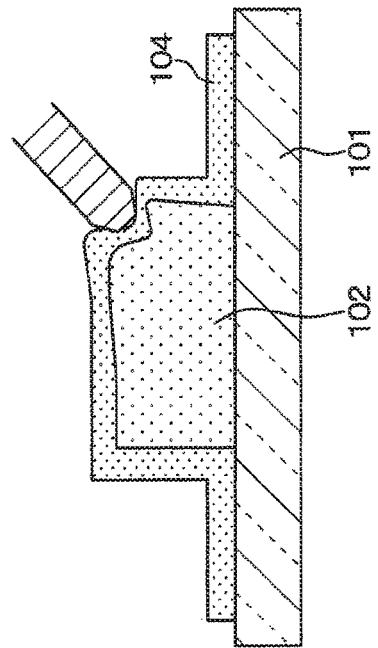
FIG. 14D

FIG. 21

| | | CHANGE POLARITIES OF OUTPUT CURRENTS | | | |
| --- | --- | --- | --- | --- | --- |
| | | DETECTION UNIT | | | |
| | | FIRST VERTICAL TRANSISTOR | SECOND VERTICAL TRANSISTOR | THIRD VERTICAL TRANSISTOR | FOURTH VERTICAL TRANSISTOR |
| HORIZONTAL LOADING DIRECTION | UP | + | 0 | + | − |
| | BOTTOM | − | 0 | − | + |
| | LEFT | 0 | − | − | − |
| | RIGHT | 0 | + | + | + |
| | TOP LEFT | 0 | 0 | 0 | − |
| | BOTTOM LEFT | 0 | 0 | − | 0 |
| | TOP RIGHT | 0 | 0 | + | 0 |
| | BOTTOM RIGHT | 0 | 0 | 0 | + |
| VERTICAL LOADING DIRECTION | PRESSING | + | + | + | + |

FIG. 23

| | | CHANGE POLARITIES OF OUTPUT CURRENTS | | | | | | | |
|---|---|---|---|---|---|---|---|---|---|
| | | DETECTION UNIT | | | | | | | |
| | | FIRST VERTICAL TRANSISTOR | SECOND VERTICAL TRANSISTOR | THIRD VERTICAL TRANSISTOR | FOURTH VERTICAL TRANSISTOR | FIFTH VERTICAL TRANSISTOR | SIXTH VERTICAL TRANSISTOR | SEVENTH VERTICAL TRANSISTOR | EIGHTH VERTICAL TRANSISTOR |
| HORIZONTAL LOADING DIRECTION | UP | + | − | 0 | 0 | + | + | − | − |
| | BOTTOM | − | + | 0 | 0 | − | − | + | + |
| | LEFT | 0 | 0 | + | − | + | − | + | − |
| | RIGHT | 0 | 0 | − | + | − | + | − | + |
| | TOP LEFT | 0 | 0 | 0 | 0 | + | 0 | 0 | − |
| | BOTTOM LEFT | 0 | 0 | 0 | 0 | 0 | + | + | 0 |
| | TOP RIGHT | 0 | 0 | 0 | 0 | 0 | 0 | − | + |
| VERTICAL LOADING DIRECTION | BOTTOM RIGHT | 0 | 0 | 0 | 0 | − | 0 | 0 | + |
| | PRESSING | + | + | + | + | + | + | + | + |

LOAD SENSOR WITH VERTICAL TRANSISTORS

CROSS REFERENCE TO RELATED APPLICATION APPLICATIONS

This application is the U.S. national stage of International Patent Application No. PCT/JP2015/004218 filed on Aug. 21, 2015 and is based on Japanese Patent Application No. 2014-187158 filed on Sep. 15, 2014, the disclosures of which are incorporated herein by reference.

TECHNICAL FIELD

The present disclosure relates to a load sensor using a vertical transistor.

BACKGROUND ART

In recent years, expectations are placed on development of a robot arm capable of a higher-level and complex task on various objects like a human being. An active research is conducted on detection of the magnitude or the direction of a load applied to a contact surface by the use of a load sensor or a tactile sensor so that a robot can steadily grasp a complicated shaped object (such as a soft thing or a complicated shaped body) without braking or falling the object by slipping.

Conventionally, there is known a sensor that is attached to the side surface of a convexly shaped elastic body in order to three-dimensionally detect the magnitude and the direction of application of a load. When loaded, the sensor can detect the magnitude and the direction of a load by detecting distortion applied to a convex portion of the elastic body.

For example, patent literature 1 forms a sensor on the side surface of a convex portion of an elastic body by fabricating the sensor on a thin film and using an adhesive material to attach the sensor to the convex portion of the elastic body whose side surface is trapezoidally shaped.

Specifically, a human tactile sense is known to exist at the density of one tactile sense per $mm^2$. For this reason, load sensors need to be integrated at the density of one sensor per $mm^2$ in order to achieve the advanced tactile sense capability like a human being.

However, the configuration described in patent literature 1 requires a process that uses an adhesive material to attach a thin film where the sensor is formed, leaving an issue of difficulty in miniaturization and high-density formation.

There is a technology that forms a thin-film organic vertical transistor on the side of a rib. A combination of this technology with the configuration described in patent literature 1 can use the thin-film technology to form a vertical transistor on the side surface of a rib that is shaped in to a trapezoid (slope of 60°). However, this configuration still leaves difficulty in separation between detection of a vertical load applied to the rib from above and detection of a horizontal load applied over a rib surface.

PRIOR ART LITERATURES

Patent Literature

Patent Literature 1: JP-2008-116371A

SUMMARY OF INVENTION

It is an object of the present disclosure to provide a load sensor capable of detecting not only the magnitude of a load, but also the direction of a load.

According to a first aspect of the present disclosure, a load sensor with vertical transistors includes: a substrate having at least a surface layer made of an insulation material; a rib arranged on the substrate, having a side surface and a top surface, including at least a surface portion made of an insulation material, and made of a material different from the substrate; and at least two vertical transistors. Each of the at least two vertical transistors includes: a gate electrode, a gate insulation film, and a semiconductor thin film which are arranged on the side surface of the rib; a bottom electrode layer arranged on a bottom of a concave portion of the substrate so as to contact the semiconductor thin film, the substrate having the concave portion on which the rib is not arranged and a convex portion on which the rib is arranged; and a top electrode layer arranged on a top of the convex portion so as to contact the semiconductor thin film. Each of the at least two vertical transistors flows current between the bottom electrode layer and the top electrode layer when a gate voltage is applied to the gate electrode to provide a channel region in the semiconductor thin film. Each of straight lines along normal line directions of the channel regions in the at least two vertical transistors is arranged on a different side surface of the rib from each other, and has a predetermined angle between the straight lines.

The above-mentioned load sensor includes at least two vertical transistors per rib. The two vertical transistors are placed over different side surfaces of the rib so as to maintain a predetermined angle between straight lines corresponding to the normal directions for the channel regions of the vertical transistors. The load sensor can detect not only the magnitude of a load, but also the direction of a load.

According to a second aspect of the present disclosure, a load sensor with vertical transistors includes: a substrate having at least a surface layer made of an insulation material; a rib arranged on the substrate, having a side surface and a top surface, including at least a surface portion made of an insulation material, and made of a material different from the substrate; and at least two sets of vertical transistors, each set having two vertical transistors as a pair. Each of the two vertical transistors includes: a gate electrode, a gate insulation film, and a semiconductor thin film which are arranged on the side surface of the rib; a bottom electrode layer arranged on a bottom of a concave portion of the substrate so as to contact the semiconductor thin film, the substrate having the concave portion on which the rib is not arranged and a convex portion on which the rib is arranged; and a top electrode layer arranged on a top of the convex portion so as to contact the semiconductor thin film. Each of the two vertical transistors flows current between the bottom electrode layer and the top electrode layer when a gate voltage is applied to the gate electrode to provide a channel region in the semiconductor thin film. Each of straight lines along normal line directions of the channel regions in the two vertical transistors of each set is arranged on a different side surface of the rib from each other, and has a predetermined angle between the straight lines. Each of the two vertical transistors in one set is arranged on the side surface of the rib opposite to the side surface of the rib on which one of the two vertical transistors in another set is arranged.

The above-mentioned load sensor includes at least four vertical transistors per rib. The vertical transistors are placed over different side surfaces at the rib so as to maintain a predetermined angle between straight lines corresponding to normal directions for channel regions of the two vertical transistors of each set. The load sensor can detect not only the magnitude of a load, but also the direction of a load.

According to a third aspect of the present disclosure, a load sensor with vertical transistors includes: a substrate having at least a surface layer made of an insulation material; a rib arranged on the substrate, having a side surface and a top surface with a polygonal shape of the top surface, including at least a surface portion made of an insulation material, and made of a material different from the substrate; and at least two vertical transistors. Each of the at least two vertical transistors includes: a gate electrode, a gate insulator film, and a semiconductor thin film which are arranged on a corner portion as an intersection between side surfaces of the rib; a bottom electrode layer arranged on a bottom of a concave portion of the substrate so as to contact the semiconductor thin film, the substrate having the concave portion on which the rib is not arranged and a convex portion on which the rib is arranged; and a top electrode layer arranged on a top of the convex portion so as to contact the semiconductor thin film. Each of the at least two vertical transistors flows current between the bottom electrode layer and the top electrode layer when a gate voltage is applied to the gate electrode to provide a channel region in the semiconductor thin film. Each of straight lines along normal line directions of the channel regions in the at least two the vertical transistor is arranged on a different corner portion of the rib from each other, and has a predetermined angle between the straight lines.

The above-mentioned load sensor includes at least two vertical transistors per rib. The two vertical transistors are placed over different corner portions of the rib so as to maintain a predetermined angle between straight lines corresponding to the normal directions for the channel regions of the vertical transistors. The load sensor can detect not only the magnitude of a load, but also the direction of a load.

According to a fourth aspect of the present disclosure, a load sensor with vertical transistors includes: a substrate having at least a surface layer made of made of an insulation material; a rib arranged on the substrate, having a side surface and a top surface with a polygonal shape of the top surface having an even number of corners, including at least a surface portion made of an insulation material, and made of a material different from the substrate; and at least two sets of vertical transistors, each set having two vertical transistors as a pair. Each of the two vertical transistors includes: a gate electrode, a gate insulation film, and a semiconductor thin film which are arranged on a corner portion as an intersection between side surfaces of the rib; a bottom electrode layer arranged on a bottom of a concave portion of the substrate so as to contact the semiconductor thin film, the substrate having the concave portion on which the rib is not arranged and a convex portion on which the rib is arranged; and a top electrode layer arranged on a top of the convex portion so as to contact the semiconductor thin film. Each of the two vertical transistors flows current between the bottom electrode layer and the top electrode layer when a gate voltage is applied to the gate electrode to provide a channel region in the semiconductor thin film. Each of straight lines along normal line directions of the channel regions in the two vertical transistors of each set is arranged on a different corner portion of the rib from each other, and has a predetermined angle between the straight lines. Each of the two vertical transistors in a first set is arranged on the corner portion of the rib diagonally opposite to the corner portion of the rib on which one of the two vertical transistors in a second set is arranged.

The above-mentioned load sensor includes at least four vertical transistors per rib. The vertical transistors are placed over different corner portions at the rib so as to maintain a predetermined angle between straight lines corresponding to normal directions for channel regions of the two vertical transistors of each set. The load sensor can detect not only the magnitude of a load, but also the direction of a load.

BRIEF DESCRIPTION OF DRAWINGS

The above and other objects, features and advantages of the present disclosure will become more apparent from the following detailed description made with reference to the accompanying drawings. In the drawings:

FIG. 3 is a graph illustrating a chronological change of electric current $I_{DS}$ in response to a load applied to the load sensor;

FIGS. 14A through 14D are sectional views illustrating effects of a structure according to the third embodiment;

FIG. 21 is a diagram illustrating a polarity pattern of an output signal from each detection unit acquired by variously changing directions of a load applied to the load sensor according to the sixth embodiment;

FIG. 23 is a diagram illustrating a polarity pattern of an output signal from each detection unit acquired by variously changing directions of a load applied to the load sensor according to the seventh embodiment;

EMBODIMENTS FOR CARRYING OUT INVENTION

Figure 1:
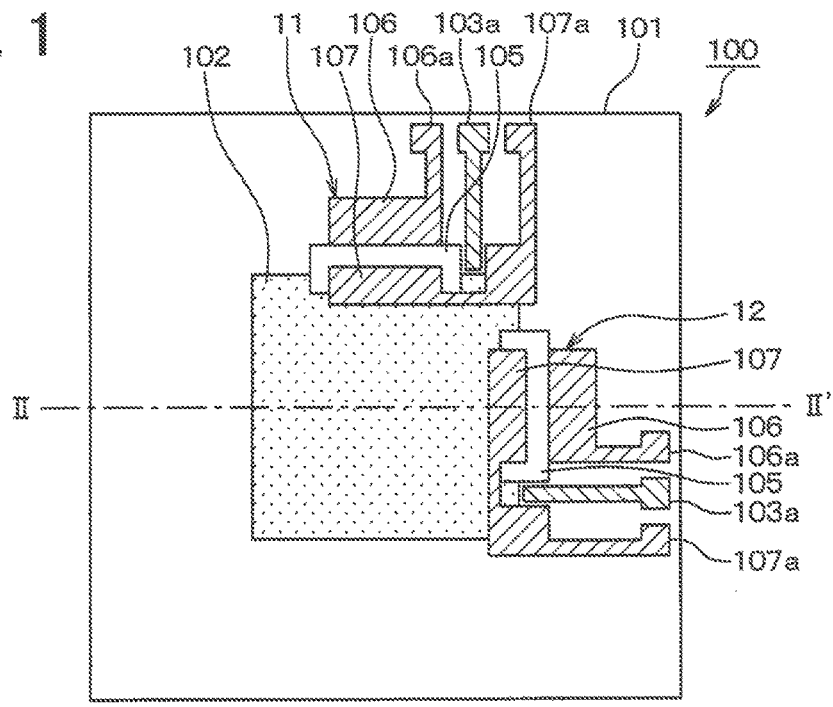
FIG. 1 is a plan view illustrating the framework of a load sensor according to a first embodiment.

Embodiments of the present disclosure will be described with reference to the accompanying drawings. Hereinafter, the mutually equal or comparable parts in the embodiments are designated by the same reference numerals.

First Embodiment

Figure 2:
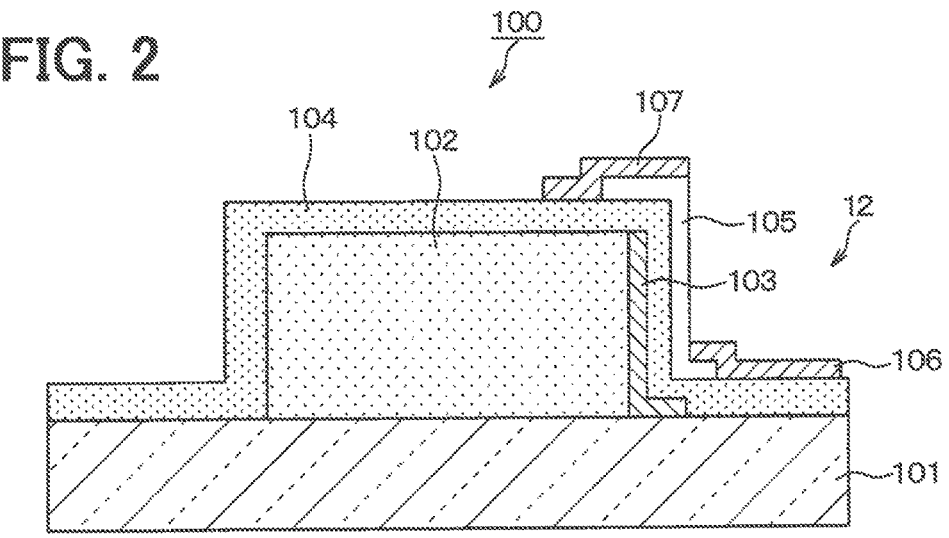
FIG. 2 is a cross sectional view taken along the line of FIG. 1.

The description below explains a first embodiment of the present disclosure. The embodiment configures the load sensor using a vertical transistor configured by using an organic semiconductor thin film. With reference to FIGS. 1 and 2, the description below explains the framework of the load sensor that uses the vertical transistor. FIG. 1 is a not a sectional view but uses hatching to easily recognize constituent elements. Similarly, though not a sectional view, a top view of a load sensor 100 uses hatching to easily recognize constituent elements in the description of each embodiment to be described later.

As illustrated in FIGS. 1 and 2, the load sensor 100 according to the embodiment is configured by forming a first vertical transistor 11 and a second vertical transistor 12 on two of side surfaces of a quadrangular rib 102 formed over a substrate 101. Specifically, the first vertical transistor 11 is formed at the top in the drawing of both side surfaces of the side surfaces of the rib 102 in FIG. 1 along the vertical direction in the drawing as a normal direction. The second vertical transistor 12 is formed at the right in the drawing of both side surfaces along the horizontal direction in the drawing as a normal direction.

The substrate 101 is configured as an insulating substrate at least whose surface is made of an insulating material such as glass or a plastic film. Specifically, elements configuring the load sensor 100 formed on the substrate 101, namely elements configuring the rib 102, the first vertical transistor 11, and the second vertical transistor 12 are configured as follows.

As above, the top surface of the rib 102 is shaped to be quadrangular. The rib 102 is made of a material that is different from the substrate 101, indicates a smaller Young's modulus than the substrate 101, and is easily deformable. For example, the rib 102 is made of an insulating material such as SU-8 (manufactured by MicroChem Corp., Young's modulus of 4 GPa) or WL-5150 (manufactured by Dow Corning Toray Co., Ltd., Young's modulus of 150 MPa) used as a photoresist. The rib 102 may be made of a thermosetting resin such as polydimethylsiloxane (PDMS, Young's modulus of 1 MPa).

According to the embodiment, the rib 102 includes a quadrangular top-surface shape as illustrated in FIG. 1 and a quadrangular cross-sectional shape as illustrated in FIG. 2. Specifically, the rib 102 is characterized by the square top surface of 2 mm×2 mm and the height (dimension in thickness direction) of 1 µm or more such as 50 µm. The position of the substrate 101 where the rib 102 is formed corresponds to a convex portion. The position of the substrate 101 where the rib 102 is not formed corresponds to a concave portion.

The first and the second vertical transistors 11 and 12 constitute a pair and provide a sensor function to detect a load. Elements of the first and the second vertical transistors 11 and 12 are configured as follows. FIG. 2 is a sectional view taken along the line II-II' of FIG. 1 and illustrates a sectional configuration of the second vertical transistor 12. The first vertical transistor 11 is also configured similarly.

A gate electrode 103 is formed over the side surface of the rib 102 by coating conductive layers such as Au and Cr in order. The gate electrode 103 formed over the side surface of the rib 102 is advantageously requested to be as thin as possible to decrease the resistance to deformation of the rib 102 when a load is applied. For example, the embodiment forms the gate electrode 103 by coating Au as thick as 60 nm and Cr as thick as 3 nm.

A gate insulator film 104 is formed over the surface of the substrate 101 and the surfaces of the rib 102 and gate electrode 103. The gate insulator film 104 is made of an insulating material such as Parylene®, $SiO_2$, alumina, or an organic material. According to the embodiment, the gate insulator film 104 is formed of Parylene as thick as 450 nm.

Over the side surface of the rib 102, an organic semiconductor thin film 105 is formed to extend from the surface of the gate insulator film 104 to the top surface of the rib 102 and a position where the rib 102 is not formed over the substrate 101. As illustrated in FIG. 1, the organic semiconductor thin films 105 for the vertical transistors 11 and 12 are separately placed to be electrically insulated from each other. The organic semiconductor thin film 105 is made of an organic semiconductor material including a high-molecular organic material, a low-molecular organic material, or a layered framework of these materials, for example. The embodiment configures the organic semiconductor thin film 105 by forming Dinaphtho-Thieno-Thiophene (©NTT) as thick as 120 nm.

A bottom electrode layer 106 made of an electrode material such as Au is formed so as to be in contact with the organic semiconductor thin film 105 over part of the organic semiconductor thin film 105 corresponding to the bottom surface of the concave portion, namely, a position where the rib 102 is not formed over the substrate 101. A top electrode layer 107 made of an electrode material such as Au is formed so as to be in contact with the organic semiconductor thin film 105 over part of the organic semiconductor thin film 105 corresponding to the top surface of the convex portion, namely, a position where the rib 102 is formed over the substrate 101. The bottom electrode layer 106 and the top electrode layer 107 are separately placed over the vertical transistor to be electrically insulated from each other. The embodiment forms the bottom electrode layer 106 and the top electrode layer 107 as thick as 20 nm, for example.

As illustrated in FIG. 2, the gate electrode 103, the bottom electrode layer 106, and the top electrode layer 107 can be electrically connected to the outside through extensions 103a, 106a, and 107a extended to part of the substrate 101 where the rib 102 is not formed.

The first and the second vertical transistors 11 and 12 are configured according to the above-mentioned framework. The first and the second vertical transistors 11 and 12 are placed over at least two side surfaces of the rib 102 so that the first and the second vertical transistors 11 and 12 are placed at positions that maintain a predetermined angle between each other. Specifically, a channel region is formed over the organic semiconductor thin film 105 to be described later. The organic semiconductor thin films 105 are placed over the two side surfaces of the rib 102 in order to place the channel regions so that a predetermined angle is maintained between straight lines corresponding to the normal directions of the channel regions.

The framework including the first and the second vertical transistors 11 and 12 as above configures the load sensor 100 according to the embodiment. The load sensor 100 according to this configuration includes a drain electrode corresponding to one of the bottom electrode layer 106 and the top electrode layer 107 and includes a source electrode corresponding to the other. The embodiment assumes the bottom electrode layer 106 to be the source and assumes the top electrode layer 107 to be the drain. However, the correspondence may be interchanged.

A channel region is formed at part of the organic semiconductor thin film 105 corresponding to a position between the drain electrode and the source electrode for the first and the second vertical transistors 11 and 12 when a predetermined gate voltage is supplied to the gate electrode 103. As a result, electric current $I_{DS}$ flows between the drain and the source through the channel region, namely, over the side surface of the rib 102.

Suppose that a load is applied to the load sensor 100 from the top of FIG. 2, namely, in the direction perpendicular to the substrate 101 (the normal direction toward the surface of the substrate 101). The rib 102 is deformed in accordance with the load.

The height of the rib 102 is thereby lowered to shorten the shortest distance between bottom electrode layer 106 and the top electrode layer 107 of the organic semiconductor thin film 105 compared to the shortest distance before the load is applied. The channel length is shortened. Shortening the channel length decrease the channel resistance.

Applying the load compresses the organic semiconductor thin film 105 to shorten the distance between molecules included in the organic semiconductor. The transfer integral increases to increase the mobility of the organic semiconductor.

Electric current $I_{DS}$ increases based on these two effects. The load can be measured based on a change in electric current $I_{DS}$. Deforming the rib 102 deforms the organic semiconductor thin film 105 to enable the load detection based on the deformation.

Specifically, FIG. 3 illustrates a result of investigation into changes of electric current $I_{DS}$ when a loaded is applied to the load sensor 100 according to the embodiment. The rib 102 is made of SU-8 and has the top surface shape of 2 mm×2 mm. The first and the second vertical transistors 11 and 12 conform to the size of W/L=2000/50 μm. The measurement uses Vgs=−20 V and Vds=−20 V. No load is applied during periods T1 and T3. During period T2, a load of 30 N is applied to the whole of rib 102 from above the rib 102 through the glass whose area is larger than 2 mm×2 mm. Regarding reference symbols, W denotes a gate width; L denotes a gate length; Vgs denotes a gate-source voltage; and Vds denotes a drain-source voltage.

Figure 4A:
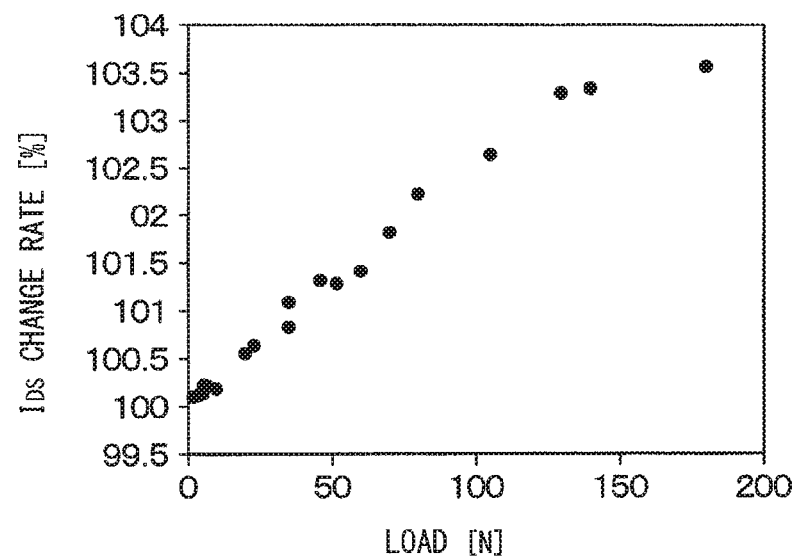
FIG. 4A is a graph illustrating relation between the magnitude of a load applied to the load sensor and a change rate of electric current $I_{DS}$.
Figure 4B:
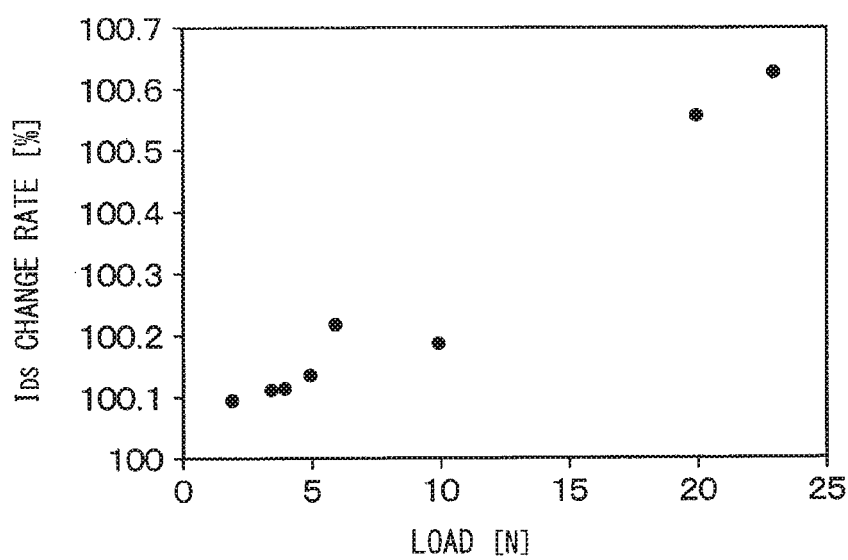
FIG. 4B is a graph illustrating an enlarged part of FIG. 4A.

FIGS. 4A through 4B illustrate results of investigation into loads and change rates of electric current $I_{DS}$.

The change rate of $_{DS}$ is defined as (average current value during period T2−average current value during period T1)/ average current value during period T1×100.

As seen from the result in FIG. 3, electric current $I_{DS}$ increases during period T2 in which a load is applied compared to period T1 in which no load is applied. Electric current $I_{DS}$ decreases again during period T3 in which the load is removed. The average current value is almost the same during periods T1 and T3. This leads to the understanding that the magnitude of load can be measured based on changes in electric current $I_{DS}$. This is because electric current $I_{DS}$ varies with a load mainly based on a change in the length of the channel region or a change in the mobility.

FIG. 4A illustrates results of loads and $I_{DS}$ change rates when load sensor 100 according to the embodiment is used to apply a load from 0 to 180 N. FIG. 4B illustrates an enlarged detail of the load from 0 to 180 N in FIG. 4A. FIGS. 4A and 4B plot detectable loads. As seen from these diagrams, the minimum detectable load is 2 N. The change rate of $_{DS}$ corresponding to the minimum detectable load is 100.095%.

The description below explains a mechanism of the load sensor 100 according to the embodiment to measure a loading direction.

Figure 5:
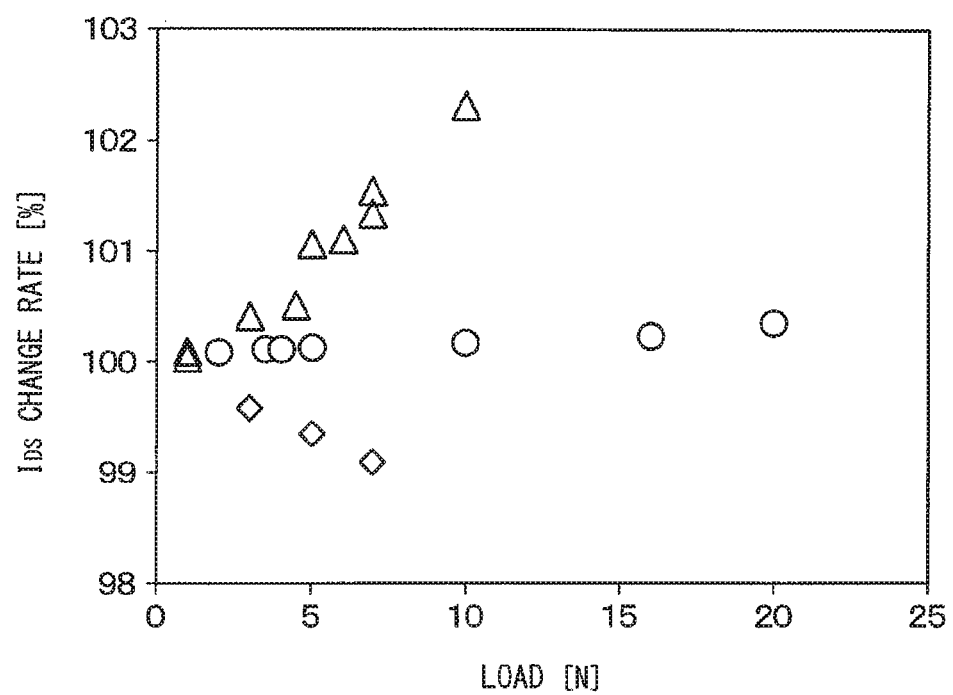
FIG. 5 is a graph illustrating relation between the magnitude of a load applied to the load sensor at a load position and a change rate of electric current $I_{DS}$.
Figure 6A:
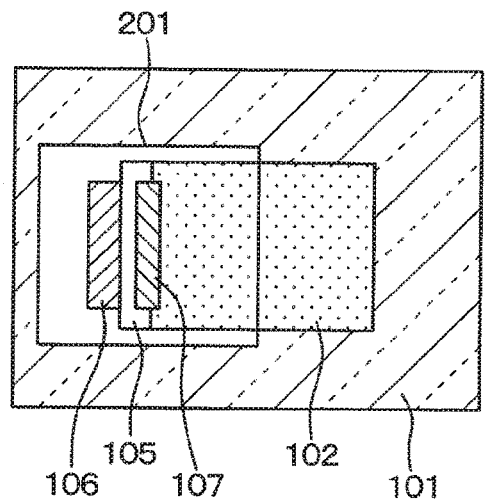
FIGS. 6A through 6C are plan views illustrating effects at load positions of the load sensor.
Figure 6B:
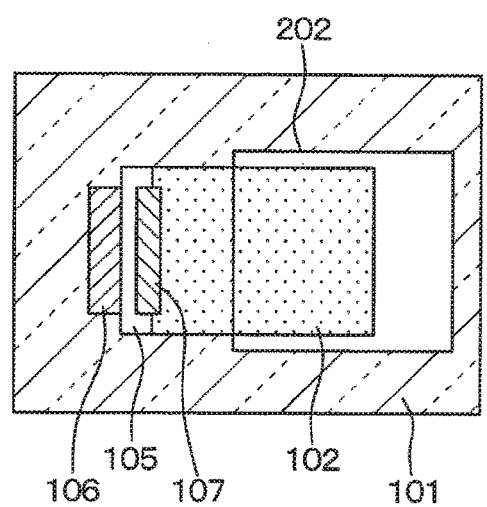
Figure 6C:
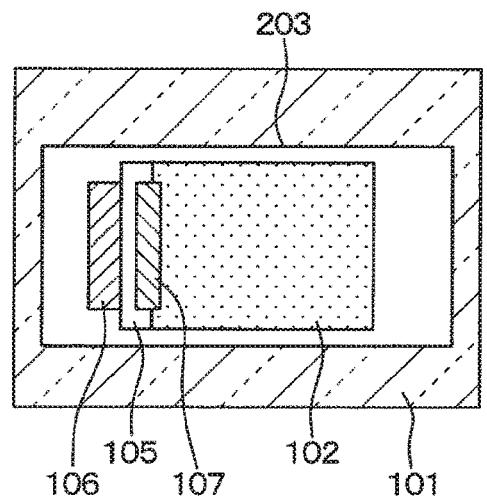

FIG. 5 illustrates results of investigation into change rates of electric current $I_{DS}$ by changing a manner of applying a load when a vertical transistor is formed on one side surface of the rib 102 whose top surface is quadrangular. Specifically, as illustrated in FIGS. 6A through 6C, a structure 201 is mounted over the rib 102. A load is applied to a region mounted with the structure 201 through the structure 201. The region to mount the structure 201 is changed for each of patterns in FIGS. 6A through 6C to change the manner of applying a load. The structure 201 uses a glass material corresponding to Young's modulus 80 GPa harder than the material of the rib 102.

Pattern 1 in FIG. 6A applies a load through the structure 201 to a part protruding from the substrate 101 (such as the rib 102 or the organic semiconductor thin film 105) where the vertical transistor is formed. In this case, no load is applied to a side surface opposite to the side surface corresponding to the vertical transistor. Pattern 2 in FIG. 6B applies a load through a structure 202 to the part protruding from the substrate 101 toward a side surface opposite to the side surface corresponding to the vertical transistor. In this case, little load is applied to the side surface corresponding to the vertical transistor.

As a result, pattern 1 increases electric current $I_{DS}$ as the load increases as indicated by a while triangle in FIG. 5. Pattern 2 decreases electric current $I_{DS}$ as the load increases as indicated by a while lozenge in FIG. 5.

Pattern 3 in FIG. 6C applies a load through a structure 203 to the whole of the part protruding from the substrate 101 including the side surface corresponding to the vertical transistor and the other side surface opposite to the side surface. The structure 203 has a contact area larger than the top surface of the rib 102.

A white circle in FIG. 5 corresponds to pattern 3. Compared to pattern 3, pattern 1 indicates that the change rate of electric current $I_{DS}$ increases, namely, $I_{DS}$ increases. Compared to pattern 3, pattern 2 indicates that the change rate of electric current $I_{DS}$ decreases, namely, $I_{DS}$ decreases.

Pattern 1 applies a load to the vertical transistor side and therefore applies a compression stress to the vertical transistor. This shortens the shortest distance of the organic semiconductor thin film 105 in the height direction. Moreover, the compression stress increases the mobility of the organic semiconductor thin film 105 and increases electric current $I_{DS}$. Pattern 2 applies a load to the side opposite to the vertical transistor and therefore applies a tensile stress to the vertical transistor. This lengthens the shortest distance of the organic semiconductor thin film 105 in the height direction. Moreover, the compression stress decreases the mobility of the organic semiconductor thin film 105 and decreases electric current $I_{DS}$.

The change rate of electric current $I_{DS}$ varies with the direction of applying a load, making it possible to recognize the direction of applying a load based on electric current $I_{DS}$. For example, the change rate of electric current $I_{DS}$ increases when a load is applied in the direction from one side surface of the vertical transistor to the opposite side surface. The change rate of electric current $I_{DS}$ decreases when a load is applied in the opposite direction. This relation helps measure not only the magnitude of a load, but also the direction of a load.

The first vertical transistor 11 is formed over one of both side surfaces of the quadrangular rib 102 according to the embodiment corresponding to the top of the drawings along the normal direction corresponding to the vertical direction in the drawings. The second vertical transistor 12 is formed over one of both side surfaces of the same corresponding to the right of the drawings along the normal direction corresponding to the horizontal direction in the drawings. As will be described, the first and the second vertical transistors 11 and 12 can detect the magnitude and direction of a load that is applied vertically or horizontally in the drawings. The first and the second vertical transistors 11 and 12 can detect the magnitude of a vertical load from above the rib 102, namely a load in the pressing direction.

Figures 7, 8:
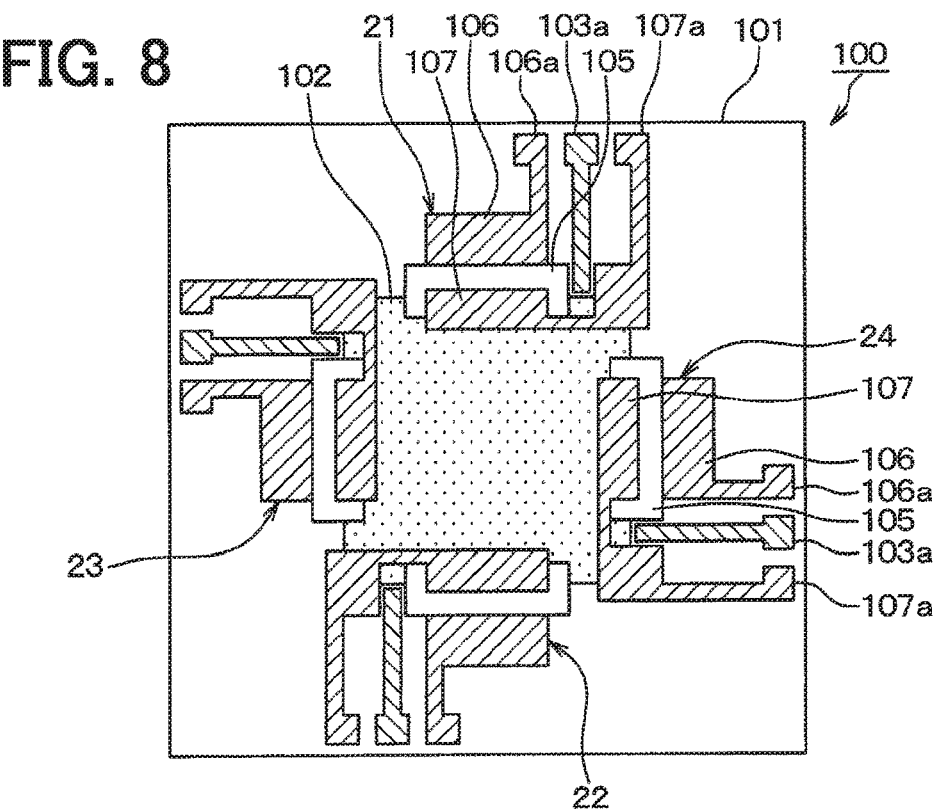
FIG. 7 is a diagram illustrating a polarity pattern of an output signal from each detection unit acquired by variously changing directions of a load applied to the load sensor according to the first embodiment.
FIG. 8 is a plan view illustrating the framework of a load sensor according to a second embodiment.

FIG. 7 is a polarity pattern table illustrating change directions of output currents from detection units that detect currents in the vertical transistors 11 and 12 under the condition of varying directions of applying a load to the load sensor 100.

In FIG. 7, "+" denotes the positive polarity (direction to increase an output current), "−" denotes the negative polarity (direction to decrease an output current), and "0" denotes an infinitesimal output change (less than or equal to a noise level) or no output change as regards the change direction polarities of output currents from the detection units.

Applying a load vertically in the drawings changes an output current from the first vertical transistor 11 to + upward or − downward. Applying a load horizontally in the drawings changes an output current from the second vertical transistor 12 to − leftward or + downward. Applying a load vertically (pressing direction) in the drawings changes an output current from the first and the second vertical transistors 11 and 12 to +.

Therefore, the first vertical transistor 11 can detect the magnitude and the direction of a load applied vertically in the drawings. The second vertical transistor 12 can detect the magnitude and the direction of a load applied horizontally in the drawings. Moreover, the first and the second vertical transistors 11 and 12 can detect the magnitude and the direction of a load applied vertically (pressing direction).

As above, the load sensor 100 according to the embodiment can detect not only the magnitude of a load, but also the direction of a load. The load sensor 100 includes the first and the second vertical transistors 11 and 12 using the rib 102 and the organic semiconductor thin film 105. The load sensor 100 can accurately measure the magnitude and the horizontal loading direction of a vertical load without causing a difficulty in sensor positioning or a decrease in the accuracy due to overlapped sensors.

Second Embodiment

The description below explains a second embodiment of the present disclosure. The second embodiment changes the number of placed vertical transistors from the first embodiment, but otherwise equals the first embodiment. The description below explains only differences from the first embodiment.

As illustrated in FIG. 8, the load sensor 100 according to the embodiment includes first through fourth vertical transistors 21 through 24. The embodiment also configures the rib 102 whose top surface is shaped to be quadrangular. Each of side surfaces of the rib 102 includes each of the first through the fourth vertical transistors 21 through 24. Specifically, the first vertical transistor 21 is formed at the top in the drawing of both side surfaces of the side surfaces of the rib 102 in FIG. 8 along the vertical direction in the drawing as a normal direction. The second vertical transistor 22 is formed at the bottom in the drawing. The third vertical transistor 23 is formed at the left in the drawing of both side surfaces of the side surfaces of the rib 102 along the horizontal direction in the drawing as a normal direction. The fourth vertical transistor 24 is formed at the right in the drawing. Of the vertical transistors 21 through 24, a pair is formed to include the two vertical transistors that are placed to form a predetermined angle between straight lines corresponding to the normal directions of the channel regions. Another pair includes the other two vertical transistors positioned opposite to the pair of the two vertical transistors. Two pairs of vertical transistors are provided. Elements of the first through the fourth vertical transistors 21 through 24 are basically the same as those of the first and the second vertical transistors 11 and 12 according to the first embodiment.

Applying a load to the load sensor 100 from the left to the right in FIG. 8 applies a stress to the two vertical transistors formed horizontally in the drawing. Specifically, a compression stress is applied to the third vertical transistor 23 at the left. A tensile stress is applied to the fourth vertical transistor 24 at the right. This causes a difference between the change rates of electric current $I_{DS}$ for the third vertical transistor 23 at the left and the fourth vertical transistor 24 at the right. Consequently, different values result from output signals from the third vertical transistor 23 at the left of the drawing and the fourth vertical transistor 24 provided for the rib 102. The direction and the magnitude of the load can be detected.

Applying a load from the top to the bottom in the drawing applies a stress to the two vertical transistors formed vertically in the drawing. Specifically, a compression stress is applied to the first vertical transistor 21 at the top. A tensile stress is applied to the second vertical transistor 22 at the bottom. This causes a difference between the change rates of electric current $I_{DS}$ for the first vertical transistor 21 at the top and the second vertical transistor 22 at the bottom. Consequently, different values result from output signals from the first vertical transistor 21 at the top in the drawing and the second vertical transistor 22 at the bottom of the drawing provided for the rib 102. The direction and the magnitude of the load can be detected.

Applying a load from the right to the left in FIG. 8 reverses the stress relation of applying a load from the left to the right in the drawing. Applying a load from the bottom to the top in FIG. 8 reverses the stress relation of applying a load from the top to the bottom in the drawing.

Figures 9, 10:
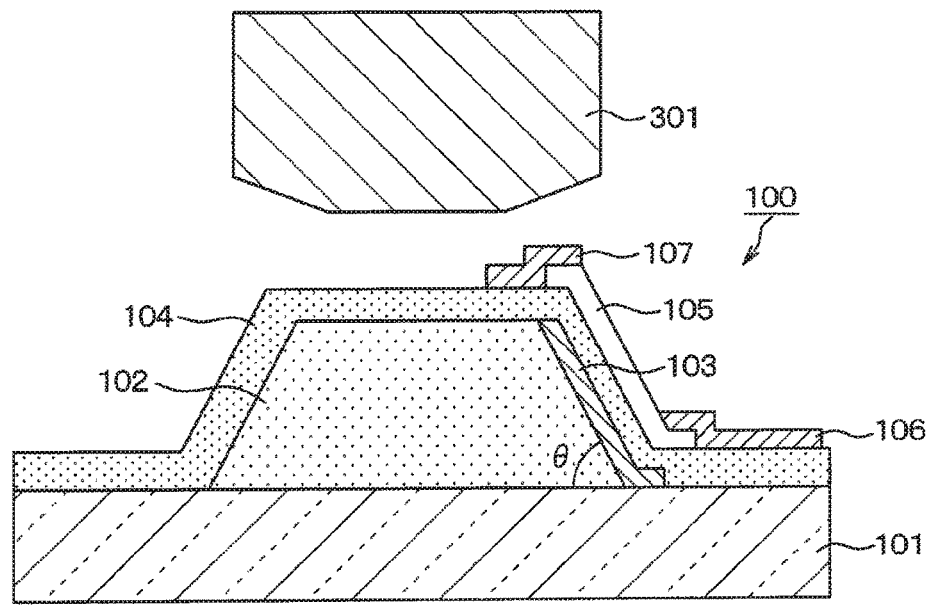
FIG. 9 is a diagram illustrating a polarity pattern of an output signal from each detection unit acquired by variously changing directions of a load applied to the load sensor according to the second embodiment.
FIG. 10 is a sectional view illustrating an effect of an angle between the bottom surface and the side surface of a rib of the load sensor.

FIG. 9 is a polarity pattern table illustrating change directions of output currents from detection units that detect currents in the vertical transistors 21 through 24 under the condition of varying directions of applying a load to the load sensor 100 in FIG. 8

In FIG. 9, "+" denotes the positive polarity (direction to increase an output current), "−" denotes the negative polarity (direction to decrease an output current), and "0" denotes an infinitesimal output change or no output change as regards the change direction polarities of output currents from the detection units.

As seen from FIG. 9, applying a load vertically in the drawing changes an output current from the first vertical transistor 21 to + upward and to − downward and changes an output current from the second vertical transistor 22 to − upward and to + downward. Applying a load horizontally in the drawing changes an output current from the third vertical transistor 23 to + leftward and to − rightward and changes an output current from the fourth vertical transistor 24 to − leftward and to + rightward. The vertical load in the drawing reverses change polarities of output currents from the first and the second vertical transistors 21 and 22. Measuring a difference between outputs from the first and the second vertical transistors 21 and 22 helps accurately detect the magnitude and the direction of the vertical load in the drawing. The horizontal load in the drawing reverses change polarities of output currents from the third and the fourth vertical transistors 23 and 24. Measuring a difference between outputs from the third and the fourth vertical transistors 23 and 24 helps accurately detect the magnitude and the direction of the horizontal load in the drawing. The vertical load (pressing load) changes directions of output currents from all the first through the fourth vertical transistors 21 through 24 to +(increase). The vertical load can be detected independently of the horizontal load.

As above, the embodiment forms the first through the fourth vertical transistors 21 through 24 over opposite side surfaces of the rib 102 along one direction. This can acquire a difference between signals and eliminate an effect of disturbance compared to the first embodiment. It is possible to accurately detect the magnitude of vertical load and the direction and the magnitude of horizontal load.

According to the embodiment, the rib 102 includes a quadrangular top-surface shape and a quadrangular cross-sectional shape. The rib 102 is shaped into a cuboid so that the vertical length (length in the vertical direction in FIG. 8) equals the horizontal length (length in the horizontal direction in FIG. 8) and the height is lower than each length.

However, the rib 102 does not always have to be a cuboid. For example, the bottom surface and the side surface of the rib 102 may not form a right angle. Advantageously, however, the bottom surface and the side surface of the rib 102 form an angle ranging from 85° to 95°. More advantageously, the angle ranges from 89.5° to 90.5°.

As illustrated in FIG. 10, suppose that angle θ is formed between the bottom surface and the side surface of the rib 102 and the rib 102 is pressed vertically from above by using a structure 301 made of glass with the Young's modulus of 80 GPa. In this case, angle θ is assumed to be 60°, for example. A load vertically applied to the rib 102 includes vertical contribution and horizontal contribution that are represented as sin 60° and cos 60° and yield values 0.87 and 0.50, respectively. In this case, the magnitude of the horizontal component belongs to the same order as that of the vertical component. The horizontal component is not negligible. For this reason, the pressing load cannot be accurately detected.

Figure 11:
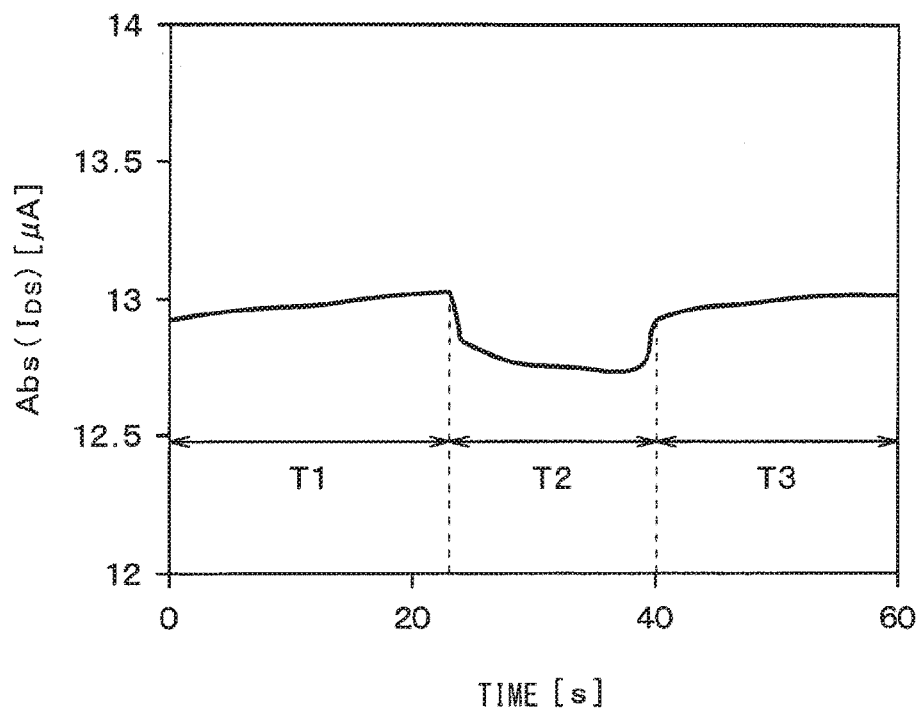
FIG. 11 is a graph illustrating a chronological change of electric current $I_{DS}$ in response to a load applied to the load sensor when an angle of 85 degrees or smaller is formed between a substrate and the side surface of the rib.

Suppose that the bottom surface and the side surface of the rib 102 form angle θ smaller than or equal to 85 degrees. In this case, as illustrated in FIG. 11, electric current $I_{DS}$ decreases during period T2 while applying a load compared to period T1 before applying a load when the load is applied to the entire top surface of the rib 102 through the structure 301. Electric current $I_{DS}$ again increases during period T3 in which the load is released. The average current value is almost the same during periods T1 and T3.

Figure 12:
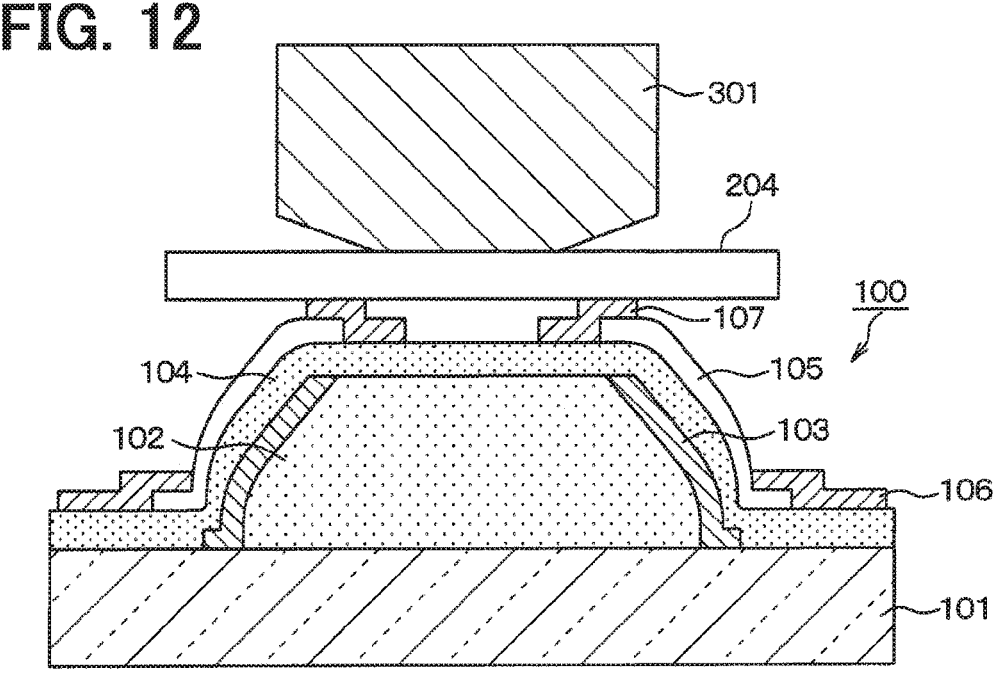
FIG. 12 is a sectional view illustrating a deformed rib when an angle of 85 degrees or smaller is formed between the substrate and the rib.

Applying a load to the whole top surface of the rib 102 outward swells the side surface of the rib 102 when the bottom surface and the side surface of the rib 102 form angle θ smaller than or equal to 85 degrees as illustrated in FIG. 12. A tensile stress is applied to the vertical transistor. This extends the shortest distance of the organic semiconductor thin film 105 in the height direction. The tensile stress decreases the mobility of the organic semiconductor thin film 105 to decrease electric current $I_{DS}$. Therefore, electric current $I_{DS}$ varies as above.

Suppose that angle θ between the bottom surface and the side surface of the rib 102 is configured to be 85°<θ<95°. The vertical contribution is represented as 0.996≤|sin θ|≤1. The horizontal contribution is represented as 0≤|cos θ|≤0.087. The horizontal contribution is 9% compared to the vertical contribution. The horizontal contribution of the load is small. More advantageously, angle θ is configured to be 89.5°<θ<90.5°. The vertical contribution is represented as 0.99996≤|sin θ|≤1. The horizontal contribution is represented as 0≤|cos θ|≤0.0087. The horizontal contribution is 0.9% compared to the vertical contribution. The horizontal contribution of the load is almost negligible. The pressing load can be detected more accurately.

Advantageously, as above, angle θ between the bottom surface and the side surface of the rib 102 at least ranges from 85° to 95°. More advantageously, angle θ ranges from 89.5° to 90.5°.

Third Embodiment

The description below explains the second embodiment of the present disclosure. Compared to the first and the second embodiments, a third embodiment adds a structure to improve the accuracy of deformation of the rib 102 due to a load, but otherwise equals the first and the second embodiments. The description below explains only differences from the first and the second embodiments. The third embodiment will be described by using an example of a framework including four vertical transistors like the second embodiment, and is also applicable to a framework including two vertical transistors like the first embodiment.

Figure 13A:
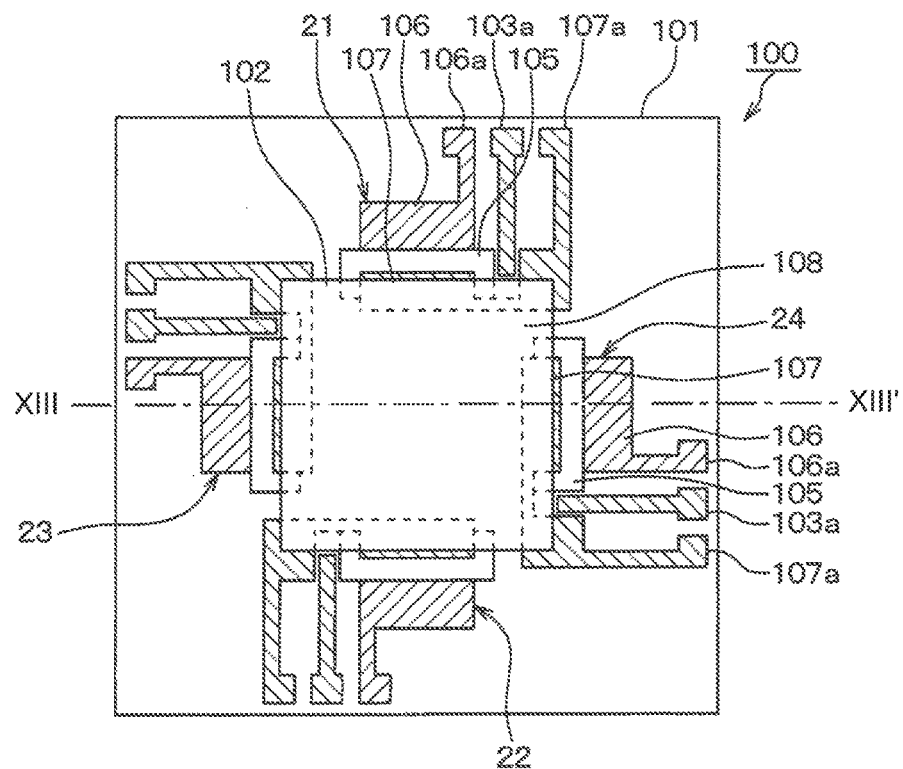
FIG. 13A is a plan view illustrating the framework of a load sensor according to a third embodiment.
Figure 13B:
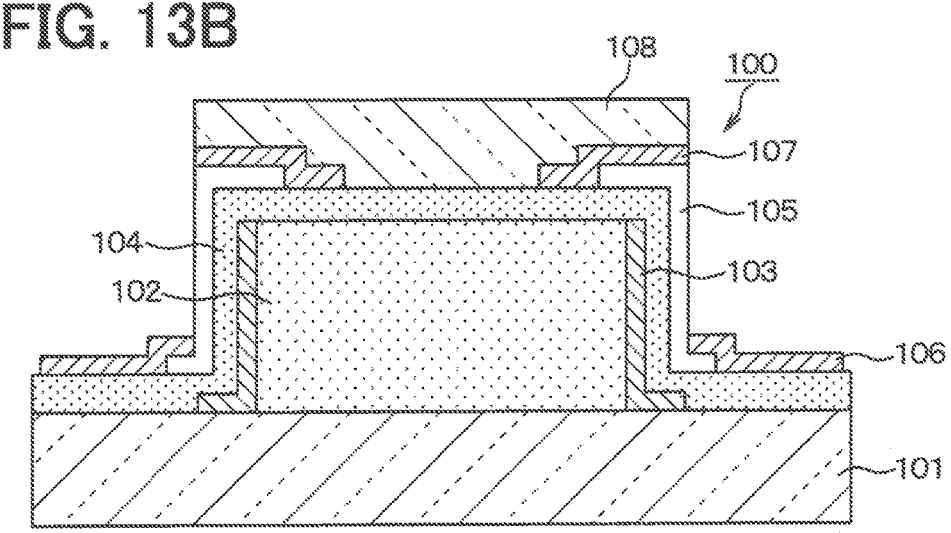
FIG. 13B is a sectional view.

As illustrated in FIGS. 13A and 13B, a structure 108 is formed over the top surface of the convex portion, namely over the substrate 101, so as to be in contact with the top electrode layer 107 formed over a part corresponding to the position where the rib 102 is formed.

The structure 108 is made of a hardly deformable material whose Young's modulus is larger than the rib 102. For example, the structure 108 is made of an insulating material such as $SiO_2$ with Young's modulus of 80 GPa or alumina with Young's modulus of 400 GPa.

FIG. 14A illustrates that the structure 108 is not formed. When a load is locally applied to the top surface of the rib 102, only part of the top surface of the rib 102 may be deformed to decrease the accuracy. FIG. 14B illustrates that the structure 108 is formed over the top surface of the rib 102. Even when a load is locally applied to the top surface of the rib 102, a load can be transferred to the whole top surface of the rib 102 through the structure 108. Therefore, the load detection accuracy can be improved.

FIG. 14C illustrates that a load is locally and slantingly applied to the rib 102 to deform the rib 102 irregularly. FIG. 14D illustrates the structure 108 is formed to accurately detect a slanting load.

As above, the load sensor 100 according to the embodiment includes the structure made of a hardly deformable material whose Young's modulus is larger than the rib 102. A load can be directly applied to the load sensor 100 without the intermediation of the glass needed for the first and the second embodiments to apply a load. A thing in any shape can be used to apply a load. Such a thing may be exemplified by a needle having a thin tip or a balloon whose shape easily varies.

Fourth Embodiment

The description below explains the fourth embodiment of the present disclosure. Compared to the third embodiment, a fourth embodiment changes the shape of the structure 108, but otherwise equals the third embodiment. The description below explains only differences from the third embodiment.

Figure 15A:
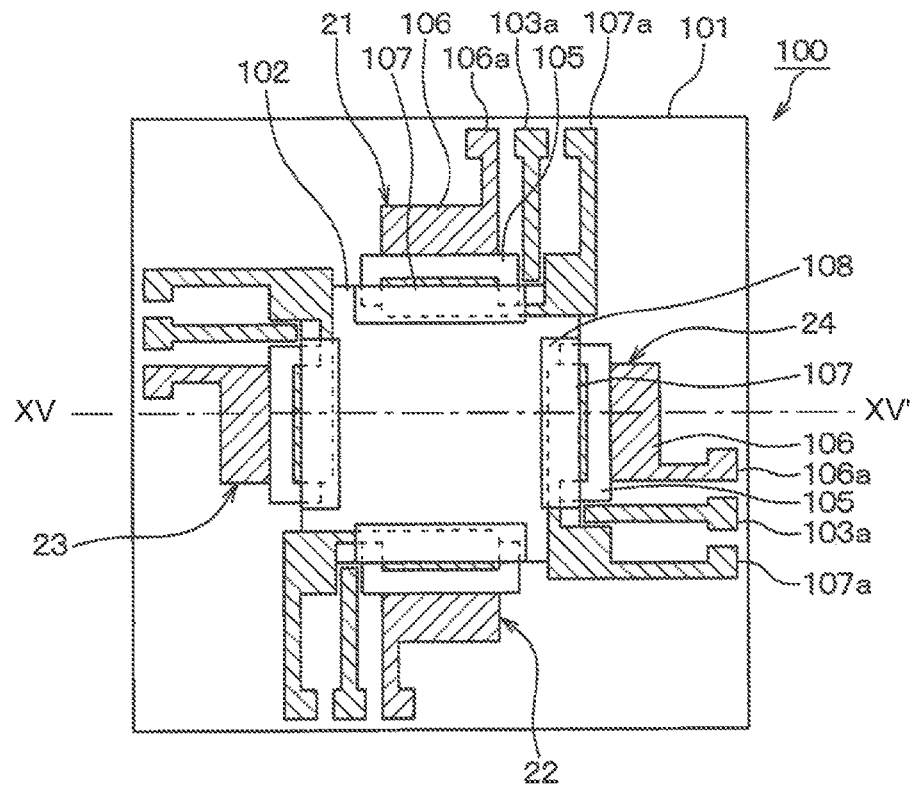
FIG. 15A is a plan view illustrating the framework of a load sensor according to a fourth embodiment.
Figure 15B:
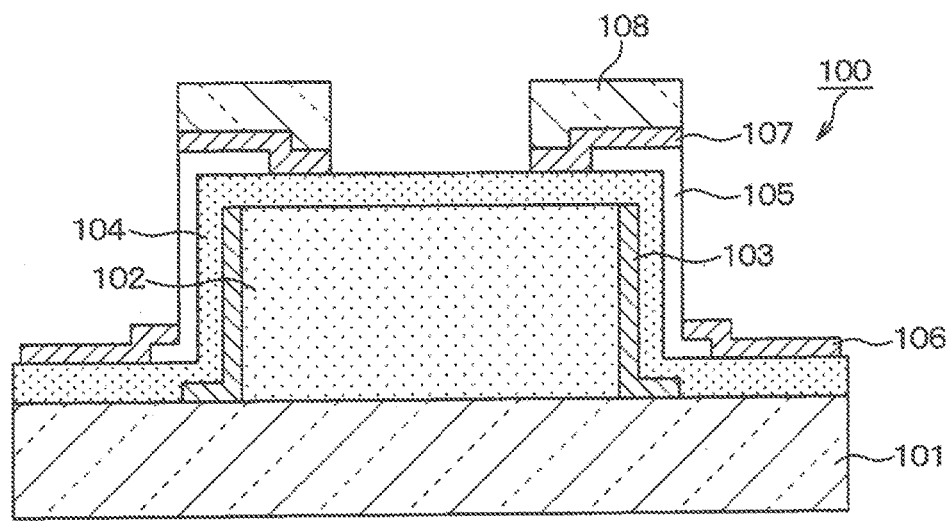
FIG. 15B is a sectional view.

As illustrated in FIGS. 15A and 15B, the structure 108 is formed over the top surface of the convex portion, namely, over the top surface of the rib 102 so as to be in contact with each top electrode layer 107 of each vertical transistor. The structure 108 is not formed over a predetermined region at the center of the top surface of the rib 102. Each structure 108 is formed to be in contact with each top electrode layer 107 of each vertical transistor at outer edges of the rib 102 except the predetermined region at the center of the top surface.

This configuration can improve the sensitivity of load detection when a load is applied locally, compared the case of forming the structure 108 all over the top surface of the rib 102 according to the third embodiment. For example, suppose that a specified load is applied to only part of, not the whole of the rib 102 and the structure 108 is formed all over the top surface of the rib 102. In this case, the load is distributively applied to the four vertical transistors 21 through 24. In contrast, the embodiment divides the structure 108 into a plurality of portions. A load is distributively applied to only some of the structures 108 and is distributively applied to only some of the four vertical transistors 21 through 24. The framework according to the embodiment divides the structure 108 into a plurality of portions and increases a pressure applied to a loaded vertical transistor. The sensitivity of load detection can be improved.

Figure 16A:
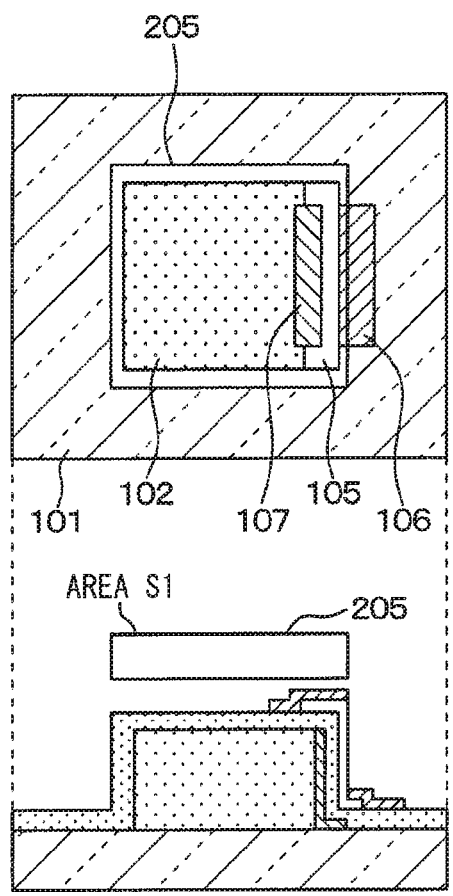
FIGS. 16A and 16B are sectional views illustrating effects of a structure according to the fourth embodiment.
Figure 16B:
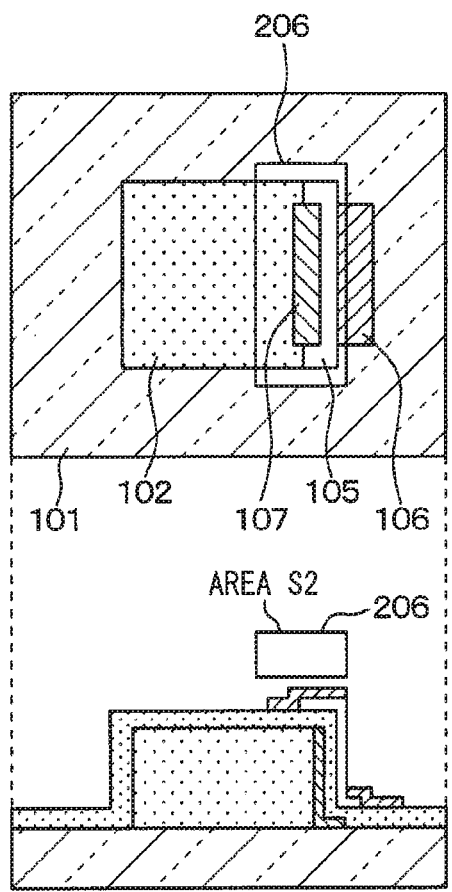

Specifically, FIG. 16A illustrates area S1 of the structure 108 that is formed all over the top surface of the rib 102. FIG. 16B illustrates area S2 of the structure 108 that is not formed over a predetermined region at the center of the top surface of the rib 102 but is formed to be in contact with each top electrode layer 107. In this case, the relation is S1>S2. The following equation expresses the relation of pressure P applied to one vertical transistor when the same load F [N] is applied to the structure 108 corresponding to each framework.

$$P1=F/S1<P2=F/S2$$

In this equation, P1 denotes pressure P according to the configuration in FIG. 16A and P2 denotes pressure P according to the configuration in FIG. 16B.

In the relation according to the embodiment, the structure 108 is not formed over the predetermined region at the center of the top surface of the rib 102 but is formed so as to be in contact with each top electrode layer 107 to more deform the rib 102.

Figures 17, 18:
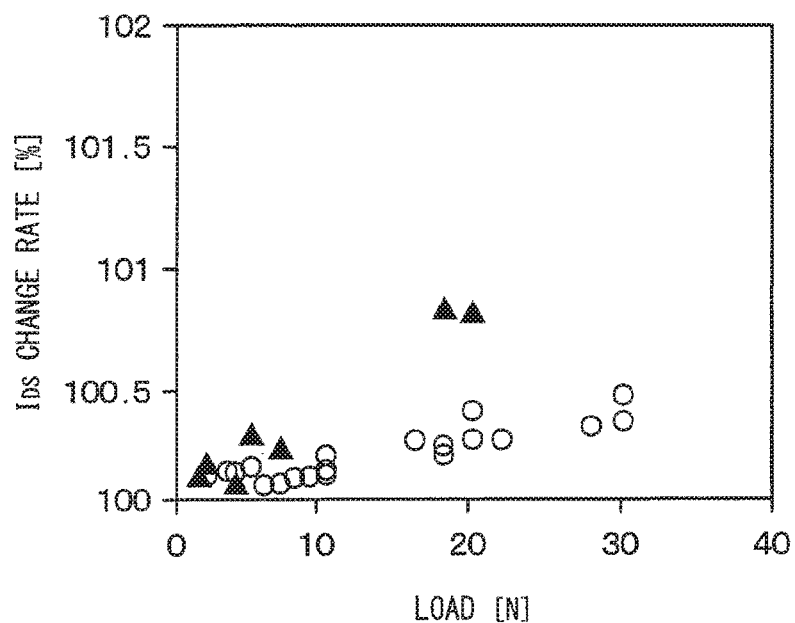
FIG. 17 is a graph illustrating relation between an electric current $I_{DS}$ change rate and the magnitude of a load applied to a load application area of the load sensor.
FIG. 18 is a sectional view illustrating the framework of a load sensor according to a fifth embodiment.

Specifically, a pressure applied to the load sensor 100 is varied by using the structures 108 with different areas S1 and S2 in FIGS. 16A and 16B to confirm the mechanism of the load sensor 100 in relation to the structure 108 according to the embodiment. As a result, the relation between a load and an electric current $I_{DS}$ change rate as illustrated in FIG. 17 is acquired. The rib 102 is made of SU-8 and has the top surface shape of 5 mm×5 mm. The vertical transistors 21 through 24 conform to the size of W/L=2000/50 μm. The measurement uses Vgs=−20 V and Vds=−20 V. Regarding reference symbols, W denotes a gate width; L denotes a gate length; Vgs denotes a gate-source voltage; and Vds denotes a drain-source voltage. The change rate of $I_{DS}$ is defined as (current value during the period of loading−average current value during the period of no loading)/average current value during the period of no loading×100.

In FIG. 17, the white circle represents a result of applying a load to the load sensor 100 by using a glass structure 205 with area S1 (6 mm×6 mm) as illustrated in FIG. 16A. The black triangle represents a result of applying a load to the load sensor 100 by using a glass structure 206 with area S2 (6 mm×3 mm) as illustrated in FIG. 16B.

As seen from the results in FIG. 17, an output ($I_{DS}$ change rate) from the load sensor 100 varies with areas of the structures 205 and 206. Specifically, decreasing the area increases the $I_{DS}$ change rate. This is because decreasing the area where a load is applied increases the pressure to increase the deformation of the rib 102. Namely, controlling the area where a load is applied can control the sensitivity to an absolute value of loading on the load sensor 100.

As above, the load sensor 100 according to the embodiment is configured so that the structure 108 is not formed over a predetermined region at the center of the top surface of the rib 102. Each structure 108 is separately formed at outer edges of the rib 102 except the predetermined region at the center of the top surface. The separated structures 108 are formed to be in contact with the corresponding vertical transistors 21 through 24. This increases a pressure applied to the vertical transistor, improves the sensitivity to an absolute value of loading, and improves the detection accuracy in the horizontal loading direction.

Fifth Embodiment

The description below explains a fifth embodiment of the present disclosure. The embodiment adds a constituent element to the fourth embodiment, but otherwise equals the fourth embodiment. The description below explains only differences from the fourth embodiment.

As illustrated in FIG. 18, the load sensor 100 according to the embodiment forms a rigid layer 109 that is in contact with the structure 108 and is not in contact with top surface of the rib 102.

The rigid layer 109 is made of a hardly deformable material whose Young's modulus is greater than or equal to the structure 108. For example, the rigid layer 109 is made of an insulating material such as $SiO_2$ with Young's modulus of 80 GPa or alumina with Young's modulus of 400 GPa. The rigid layer 109 may be made of metal such as Au whose Young's modulus is 78 GPa. Namely, the descending order of values of the Young's modulus is represented as the rigid layer 109 the structure 108>the rib 102.

Figure 19A:
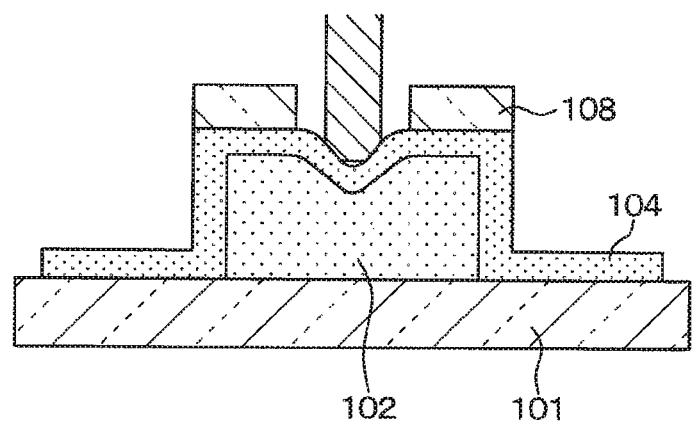
FIGS. 19A and 19B are sectional views illustrating effects of a structure according to the fifth embodiment.
Figure 19B:
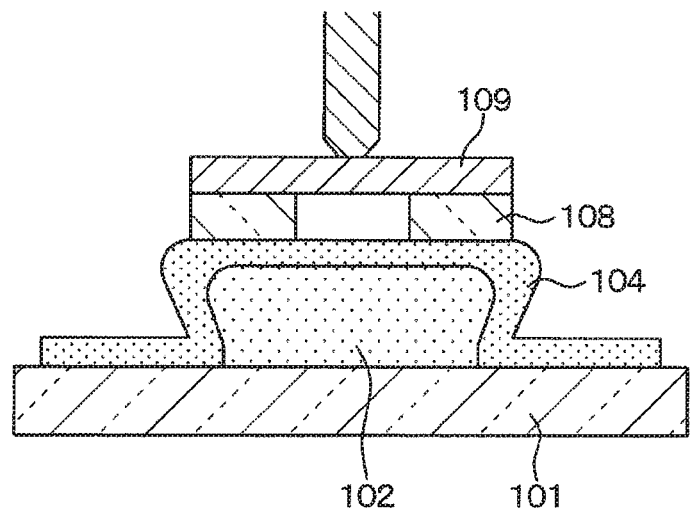

FIG. 19A illustrates that a load is locally applied to a portion where the structure 108 is not formed. In this case, the load may not be accurately transferred to the rib 102. However, FIG. 19B illustrates that the rigid layer 109 is formed so as to cover the top surface of the rib 102. In this case, the load can be accurately transferred to the rib 102 even if the load is applied locally. According to the framework illustrated in FIGS. 13A and 13B, the structure 108 is formed all over the vertical transistors 21 through 24.

However, according to the embodiment as illustrated in FIG. 19B, the structure 108 is formed over each of the vertical transistors 21 through 24 and can locally transfer the load individually. This can allow the load sensor 100 to improve the accuracy in detecting the load magnitude and the sensitivity in detecting an absolute value of the load.

As above, the load sensor 100 according to the embodiment includes the rigid layer 109 that uses the framework described in the fourth embodiment and is placed so as to be in contact with the structure 108 and not in contact with the top surface of the rib 102. Consequently, in addition to the effect described in the fourth embodiment, a load can be accurately transferred to the rib 102 via the rigid layer 109 even if the load is applied to a portion where the structure 108 is not formed. A thing in any shape can be used to apply a load. Such a thing may be exemplified by a needle having a thin tip or a balloon whose shape easily varies.

Sixth Embodiment

The description below explains a sixth embodiment of the present disclosure. Compared to the first embodiment, the sixth embodiment adds a vertical transistor and improves the spatial resolution of a horizontal load, but otherwise equals the first embodiment. The description below explains only differences from the first embodiment.

Figure 20:
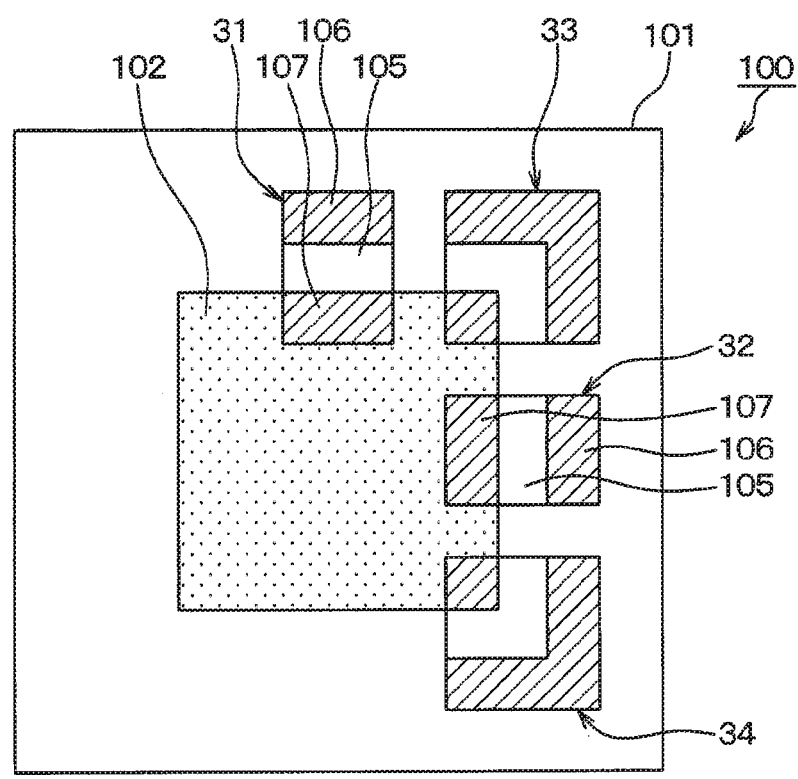
FIG. 20 is a plan view illustrating the framework of a load sensor according to a sixth embodiment.

Specifically, according to the embodiment, a first vertical transistor 31 is formed at the top in the drawing of both side surfaces of the side surfaces of the rib 102 in FIG. 20 along the vertical direction in the drawing as a normal direction. A second vertical transistor 32 is formed at the right in the drawing of both side surfaces along the horizontal direction in the drawing as a normal direction. Viewed from the top surface in FIG. 20, a third vertical transistor 33 is formed at the corner corresponding to an intersection between the top side surface and the right side surface of the rib 102. A fourth vertical transistor 34 is formed at the corner corresponding to an intersection between the bottom side surface and the right side surface of the rib 102.

FIG. 21 is a polarity pattern table illustrating change directions of output currents from detection units that detect currents in the vertical transistors 31 through 34 under the condition of varying directions of applying a load to the load sensor 100 according to the embodiment configured as above.

In FIG. 21, "+" denotes the positive polarity (direction to increase an output current), "−" denotes the negative polarity (direction to decrease an output current), and "0" denotes an infinitesimal output change or no output change as regards the change direction polarities of output currents from the detection units.

The description below explains load detection of the load sensor 100 according to the embodiment by using an example. FIG. 21 illustrates the relation among polarity patterns of change directions of output currents from the vertical transistors 31 through 34 under the condition of varying directions of applying a load to the load sensor 100 according to the embodiment. Therefore, the direction of the applied load can be detected based on the polarities of currents output from the first through the fourth vertical transistors 31 through 34.

For example, suppose that a current change of positive (+) polarity is detected from the third vertical transistor 33 and a small current change or no current change is detected from the fourth vertical transistor 34. In this case, a load can be determined to be applied in the top right direction of FIG. 20 as the drawing according to FIG. 21. A load can be also detected in the vertical and horizontal directions by simultaneously detecting outputs from the first vertical transistor 31 and the second vertical transistor 32.

Specifically, suppose that a current change of positive (+) polarity is detected from the first and the third vertical transistors 31 and 33, a small current change or no current change is detected from the second vertical transistor 32, and a current change of negative (−) polarity is detected from the first and the fourth vertical transistor 34. In this case, a load can be determined to be applied in the top direction of the drawing according to FIG. 21.

The magnitude and the direction of a slantingly applied load can be accurately detected by forming the third and the fourth vertical transistors 33 and 34 at the corners of the rib 102. A slanting load and a vertical or horizontal load can be separately detected by forming the first and the second vertical transistors 31 and 32 at at least two side surfaces of the rib 102 that form a predetermined angle. The load sensor 100 according to the first embodiment is capable of detection in the horizontal loading direction corresponding to two axial directions, namely, the vertical direction and the horizontal direction in the drawing. However, the load sensor 100 according to the sixth embodiment is capable of detection in the slanting directions that are not parallel to each other. This signifies that the resolution capability in the horizontal loading direction doubles.

As above, the load sensor 100 according to the embodiment is configured so that the first through the fourth vertical transistors 31 through 34 are formed at the corner as an intersection between the top side surface and the right side surface of the rib 102 and at the corner as an intersection between the bottom side surface and the right side surface of the rib 102 viewed from the top surface. The embodiment can twice improve the spatial resolution in the horizontal loading direction.

Seventh Embodiment

The description below explains a seventh embodiment of the present disclosure. Compared to the sixth embodiment, the seventh embodiment adds a vertical transistor and further improves the detection accuracy in a horizontal load applied in directions other than the normal direction for the side surfaces of the rib 102, but otherwise equals the sixth embodiment. The description below explains only differences from the sixth embodiment.

Figure 22:
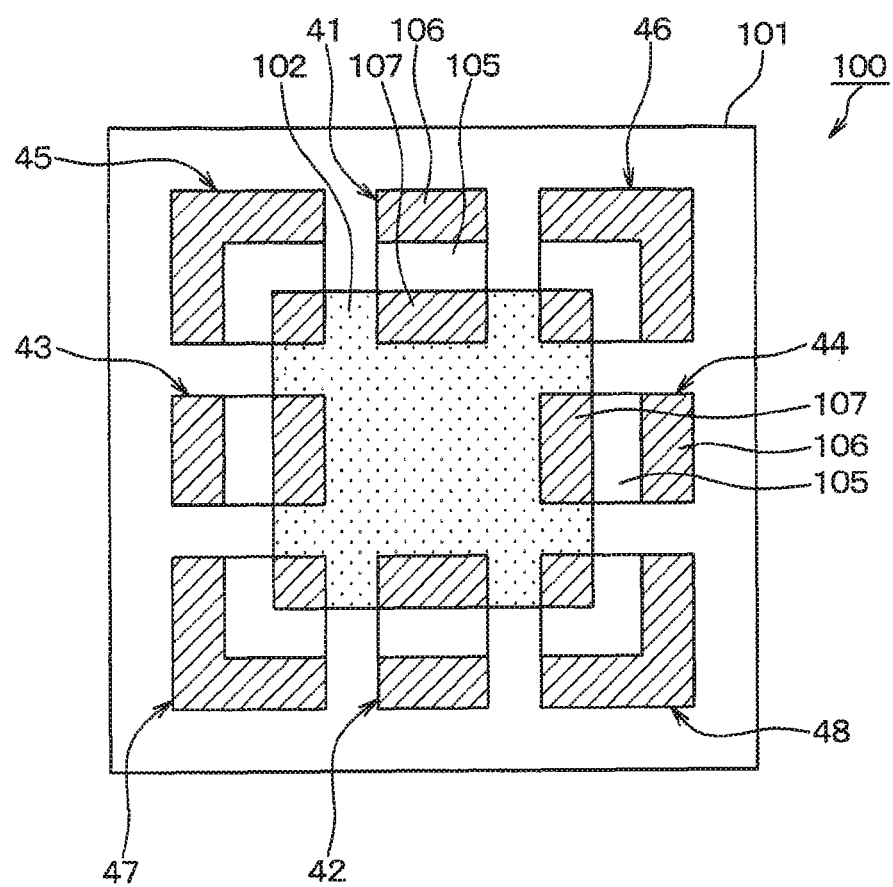
FIG. 22 is a plan view illustrating the framework of a load sensor according to a seventh embodiment.

As illustrated in FIG. 22, the load sensor 100 according to the embodiment is configured so that vertical transistors are formed at all side surfaces and corners each as an intersection between the side surfaces of the rib 102 viewed from the top surface. Specifically, first through fourth vertical transistors 41 through 44 are placed at the side surfaces of the rib 102 similarly to the second embodiment. Moreover, fifth through eighth vertical transistors 45 through 48 are placed at corners each as an intersection between the side surfaces of the rib 102 similarly to the sixth embodiment.

FIG. 23 is a polarity pattern table illustrating change directions of output currents from detection units that detect currents in the vertical transistors 41 through 48 under the condition of varying directions of applying a load to the load sensor 100 according to the embodiment configured as above.

In FIG. 23, "+" denotes the positive polarity (direction to increase an output current), "−" denotes the negative polarity (direction to decrease an output current), and "0" denotes an infinitesimal output change or no output change as regards the change direction polarities of output currents from the detection units.

The description below explains load detection of the load sensor 100 according to the embodiment by using an example. FIG. 23 illustrates the relation among polarity patterns of change directions of output currents from the vertical transistors 41 through 44 under the condition of varying directions of applying a load to the load sensor 100 according to the embodiment. Therefore, the direction of the applied load can be detected based on the polarities of currents output from the first through the eighth vertical transistors 41 through 48. Particularly, the load sensor 100 according to the embodiment can detect a load in the slanting direction.

The description below explains the load detection in the slanting direction by using an example. Suppose that a current change of positive (+) polarity is detected from the fifth vertical transistor 45, a small current change or no current change is detected from the sixth vertical transistor 46 and the seventh vertical transistor 47, and a current change of negative (−) polarity is detected from the eighth vertical transistor. In this case, a load can be determined to be applied in the top left direction of FIG. 22 as the drawing according to FIG. 23. The fifth vertical transistor 45 and the eighth vertical transistor 48 are placed at the corners that are diagonally positioned. The magnitude and the direction of a load applied in the top left direction of the drawing can be accurately detected by detecting a difference between outputs from the fifth vertical transistor 45 and the eighth vertical transistor 48.

Vertical and horizontal loads can be accurately detected by simultaneously detecting outputs from the first through the fourth vertical transistors 41 through 44. Specifically, suppose that a current change of positive (+) polarity is detected from the first vertical transistor 41 and the third vertical transistor 43, a current change of negative (−) polarity is detected from the second vertical transistor 42, and a small current change or no current change is detected from the fourth vertical transistor 44. In this case, a load can be determined to be applied in the top direction of the drawing according to FIG. 23.

As above, the load sensor 100 according to the embodiment is configured so that the vertical transistors are formed at the corners as intersections among all the side surfaces of the rib 102. Consequently, in addition to the effect described in the sixth embodiment, the seventh embodiment can accurately detect a load in the slanting direction based on a difference between outputs from the vertical transistors formed at the opposite corners along the axial direction in response to a load applied slantingly in the drawings. In addition, the embodiment can accurately and separately detect loads applied in the slanting, vertical, and horizontal directions by forming the vertical transistors over the vertical and the horizontal side surfaces of the rib 102 and can improve the spatial resolution in the horizontal loading direction.

Other Embodiments

Figure 24:
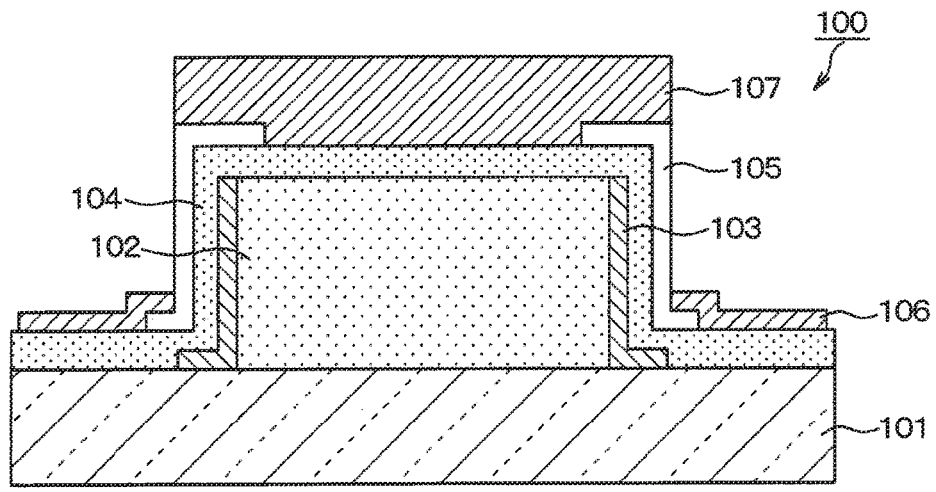
FIG. 24 is a sectional view illustrating the framework of a load sensor according to another embodiment.

According to the above-mentioned embodiments, the structure 108 is made of the material different from that of the top electrode layer 107. However, the top electrode layer 107 may replace the structure 108 as illustrated in FIG. 24. This can eliminate the need to form the structure 108 illustrated in FIGS. 13A and 13B as a separate member and can simplify the device.

Figure 25:
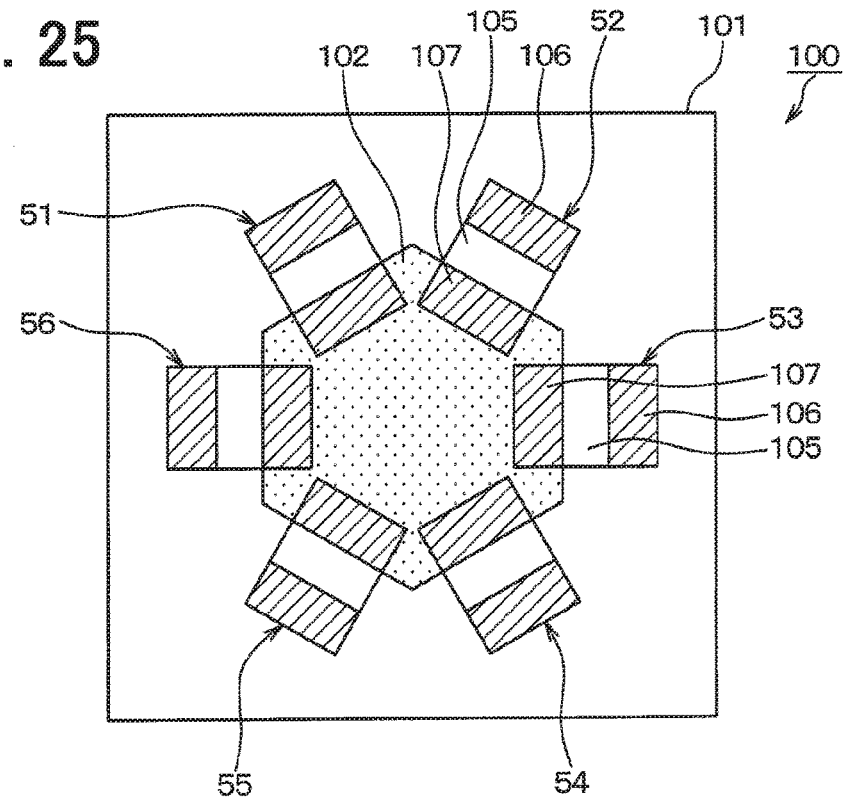
FIG. 25 is a plan view illustrating the framework of the load sensor according to another embodiment.

The above-mentioned embodiments have been described by using the example of the rib 102 whose top surface is shaped to be quadrangular. However, the present disclosure is not limited thereto. For example, the rib 102 may include the top surface that is shaped to be circular, oval, or polygonal. For example, the rib 102 may be shaped to be hexagonal as illustrated in FIG. 25. In this case, the direction detection accuracy can be improved by configuring the vertical transistors along the side surfaces of the hexagon.

The rib 102 may be shaped into a polygon that includes an even number of angles. In this case, two vertical transistors are paired and are place at two different corners so as to maintain an angle between straight lines corresponding to the normal directions of the channel regions for the two vertical transistors. A second set of two vertical transistors is paired differently from the first set of the two vertical transistors. The second set of two vertical transistors is placed at a corner diagonal to the corner where the first set of two vertical transistors is placed. A load in the slanting direction can be detected as described in the seventh embodiment.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A load sensor with vertical transistors comprising:
   a substrate having at least a surface layer made of an insulation material;
   a rib arranged on the substrate, having a side surface and a top surface, including at least a surface portion made of an insulation material, and made of a material different from the substrate; and
   at least two vertical transistors, wherein:
   each of the at least two vertical transistors includes:
      a gate electrode, a gate insulation film, and a semiconductor thin film which are arranged on the side surface of the rib;
      a bottom electrode layer arranged on a bottom of a concave portion of the substrate so as to contact the semiconductor thin film, the substrate having the concave portion on which the rib is not arranged and a convex portion on which the rib is arranged; and
      a top electrode layer arranged on a top of the convex portion so as to contact the semiconductor thin film;
   each of the at least two vertical transistors flows current between the bottom electrode layer and the top electrode layer when a gate voltage is applied to the gate electrode to provide a channel region in the semiconductor thin film;
   each of straight lines along normal line directions of the channel regions in the at least two vertical transistors is arranged on a different side surface of the rib from each other, and has a predetermined angle between the straight lines, and
   wherein the predetermined angle between the straight lines is larger than zero.

2. The load sensor according to claim 1, wherein:
   an angle between the bottom of the concave portion and the side surface of the rib is in a range between 85 degrees and 95 degrees.

3. The load sensor according to claim 1, wherein:
an angle between the bottom of the concave portion and the side surface of the rib is in a range between 89.5 degrees and 90.5 degrees.

4. The load sensor according to claim 1, wherein:
a structure is made of a material having Young's modulus larger than the rib, and
the structure is arranged on the top surface of the rib.

5. The load sensor according to claim 4, wherein:
the structure is not arranged on a predetermined region of the rib around a center of the top surface of the rib; and
the structure is arranged on at least the top electrode layer disposed on the top surface of the rib.

6. The load sensor according to claim 4, further comprising:
a rigid layer arranged on the structure and having Young's modulus larger than the structure.

7. A load sensor with vertical transistors comprising:
a substrate having at least a surface layer made of an insulation material;
a rib arranged on the substrate, having a side surface and a top surface, including at least a surface portion made of an insulation material, and made of a material different from the substrate; and
at least two sets of vertical transistors, each set having two vertical transistors as a pair, wherein:
each of the two vertical transistors includes:
a gate electrode, a gate insulation film, and a semiconductor thin film which are arranged on the side surface of the rib;
a bottom electrode layer arranged on a bottom of a concave portion of the substrate so as to contact the semiconductor thin film, the substrate having the concave portion on which the rib is not arranged and a convex portion on which the rib is arranged; and
a top electrode layer arranged on a top of the convex portion so as to contact the semiconductor thin film;
each of the two vertical transistors flows current between the bottom electrode layer and the top electrode layer when a gate voltage is applied to the gate electrode to provide a channel region in the semiconductor thin film;
each of straight lines along normal line directions of the channel regions in the two vertical transistors of each set is arranged on a different side surface of the rib from each other, and has a predetermined angle between the straight lines;
each of the two vertical transistors in one set is arranged on the side surface of the rib opposite to the side surface of the rib on which one of the two vertical transistors in another set is arranged, and
wherein the predetermined angle between the straight lines is larger than zero.

8. A load sensor with vertical transistors comprising:
a substrate having at least a surface layer made of an insulation material;
a rib arranged on the substrate, having a side surface and a top surface with a polygonal shape of the top surface, including at least a surface portion made of an insulation material, and made of a material different from the substrate; and
at least two vertical transistors, wherein:
each of the at least two vertical transistors includes:
a gate electrode, a gate insulator film, and a semiconductor thin film which are arranged on a corner portion as an intersection between side surfaces of the rib;
a bottom electrode layer arranged on a bottom of a concave portion of the substrate so as to contact the semiconductor thin film, the substrate having the concave portion on which the rib is not arranged and a convex portion on which the rib is arranged; and
a top electrode layer arranged on a top of the convex portion so as to contact the semiconductor thin film;
each of the at least two vertical transistors flows current between the bottom electrode layer and the top electrode layer when a gate voltage is applied to the gate electrode to provide a channel region in the semiconductor thin film;
each of straight lines along normal line directions of the channel regions in the at least two the vertical transistor is arranged on a different corner portion of the rib from each other, and has a predetermined angle between the straight lines, and
wherein the predetermined angle between the straight lines is larger than zero.

9. A load sensor with vertical transistors comprising:
a substrate having at least a surface layer made of made of an insulation material;
a rib arranged on the substrate, having a side surface and a top surface with a polygonal shape of the top surface having an even number of corners, including at least a surface portion made of an insulation material, and made of a material different from the substrate; and
at least two sets of vertical transistors, each set having two vertical transistors as a pair, wherein:
each of the two vertical transistors includes:
a gate electrode, a gate insulation film, and a semiconductor thin film which are arranged on a corner portion as an intersection between side surfaces of the rib;
a bottom electrode layer arranged on a bottom of a concave portion of the substrate so as to contact the semiconductor thin film, the substrate having the concave portion on which the rib is not arranged and a convex portion on which the rib is arranged; and
a top electrode layer arranged on a top of the convex portion so as to contact the semiconductor thin film;
each of the two vertical transistors flows current between the bottom electrode layer and the top electrode layer when a gate voltage is applied to the gate electrode to provide a channel region in the semiconductor thin film;
each of straight lines along normal line directions of the channel regions in the two vertical transistors of each set is arranged on a different corner portion of the rib from each other, and has a predetermined angle between the straight lines;
each of the two vertical transistors in a first set is arranged on the corner portion of the rib diagonally opposite to the corner portion of the rib on which one of the two vertical transistors in a second set is arranged, and
wherein the predetermined angle between the straight lines is larger than zero.

* * * * *